(12) United States Patent
Mizuno et al.

(10) Patent No.: US 11,703,830 B2
(45) Date of Patent: Jul. 18, 2023

(54) PRODUCTION SYSTEM, RECOVERY SYSTEM, PRODUCTION METHOD, AND INFORMATION STORAGE MEDIUM

(71) Applicant: Kabushiki Kaisha Yaskawa Denki, Kitakyushu (JP)

(72) Inventors: Naoki Mizuno, Kitakyushu (JP); Takahiko Suzuki, Kitakyushu (JP); Shinichiro Obata, Kitakyushu (JP); Takaaki Shogaki, Kitakyushu (JP); Megumi Yasuda, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 50 days.

(21) Appl. No.: 17/118,432

(22) Filed: Dec. 10, 2020

(65) Prior Publication Data

US 2021/0181717 A1 Jun. 17, 2021

(30) Foreign Application Priority Data

Dec. 16, 2019 (JP) ................................. 2019-226122

(51) Int. Cl.
*G05B 19/4155* (2006.01)

(52) U.S. Cl.
CPC ............ *G05B 19/4155* (2013.01); *G05B 2219/31449* (2013.01)

(58) Field of Classification Search
None
See application file for complete search history.

(56) References Cited

U.S. PATENT DOCUMENTS 5,369,569 A * 11/1994 Maeda ............... G05B 19/0428
700/79
5,590,036 A * 12/1996 Maeda ................... G05B 9/02
700/79

(Continued)

FOREIGN PATENT DOCUMENTS

JP H05134719 A 6/1993
JP H11184509 A 7/1999

(Continued)

OTHER PUBLICATIONS

Office Action dated Mar. 17, 2020, for corresponding JP Application No. 2019-226122 with partial English translation.

(Continued)

*Primary Examiner* — Mohammad Ali
*Assistant Examiner* — David Earl Ogg
(74) *Attorney, Agent, or Firm* — Hea Law PLLC

(57) ABSTRACT

Provided is a production system including: an industrial machine configured to execute each of a plurality of processes; and a circuitry, the circuitry being configured to: detect an abnormality that has occurred in the industrial machine; receive, when the abnormality is detected, a specification of one or more processes to be executed in order to perform recovery, based on process information associating, for each of the plurality of processes, at least a name of the each of the plurality of processes with a variable representing an operation of the industrial machine and indicating that at least one of refer or change is to be performed by a process program to be executed in the each of the plurality of processes; and record recovery process information indicating the received one or more processes.

21 Claims, 15 Drawing Sheets

(56) References Cited

U.S. PATENT DOCUMENTS

| | | | | | |
|---|---|---|---|---|---|
| 2004/0165209 | A1* | 8/2004 | Aoki | ................ | G03G 15/5012 |
| | | | | | 358/1.14 |
| 2007/0118638 | A1* | 5/2007 | Ban | ................ | G05B 23/0272 |
| | | | | | 709/224 |
| 2015/0287318 | A1* | 10/2015 | Nair | ................ | G06Q 10/10 |
| | | | | | 340/5.6 |
| 2017/0351226 | A1* | 12/2017 | Bliss | ................ | G06F 16/2471 |
| 2021/0365018 | A1* | 11/2021 | Belouin | ................ | G06F 30/20 |

FOREIGN PATENT DOCUMENTS

| | | | |
|---|---|---|---|
| JP | 2001154709 A | 6/2001 | |
| JP | 2009271572 A | 11/2009 | |
| JP | 2012194678 A | 10/2012 | |
| JP | 2019192067 A | 10/2019 | |

OTHER PUBLICATIONS

Office Action dated Jul. 28, 2020, for corresponding JP Application No. 2019-226122 with partial English translation.

* cited by examiner

FIG.7

| MACHINE NAME | PROCESS INFORMATION | |
| --- | --- | --- |
| | PROCESS NAME | VARIABLE NAME |
| INDUSTRIAL MACHINE 30A | DOOR OPENING PROCESS | A1.Start |
| | | A1.Abort |
| | | A1.Busy |
| | | A1.End |
| | CHUCKING PROCESS | A2.Start |
| | | A2.Abort |
| | | A2.Busy |
| | | A2.End |
| | MACHINING PROCESS | A3.Start |
| | | A3.Abort |
| | | A3.Busy |
| | | A3.End |
| | TOOL CLEARANCE PROCESS | A4.Start |
| | | A4.Abort |
| | | A4.Busy |
| | | A4.End |
| | CHUCK OFF PROCESS | A5.Start |
| | | A5.Abort |
| | | A5.Busy |
| | | A5.End |
| | ⋮ | ⋮ |
| INDUSTRIAL MACHINE 30B | RECOGNIZING PROCESS | B1.Start |
| | | B1.Abort |
| | | B1.Busy |
| | | B1.End |
| | MOVING PROCESS | B2.Start |
| | | B2.Abort |
| | | B2.Busy |
| | | B2.End |
| | GRIPPING PROCESS | B3.Start |
| | | B3.Abort |
| | | B3.Busy |
| | | B3.End |
| | CONVEYING PROCESS | B4.Start |
| | | B4.Abort |
| | | B4.Busy |
| | | B4.End |
| | RELEASE PROCESS | B5.Start |
| | | B5.Abort |
| | | B5.Busy |
| | | B5.End |
| | ⋮ | ⋮ |

| RECOVERY PROCESS NAME | RECOVERY PROCESS INFORMATION | | |
|---|---|---|---|
| | EXECUTION ORDER | MACHINE NAME | PROCESS NAME |
| RECOVERY MACRO X | 1 | INDUSTRIAL MACHINE30A | DOOR OPENING PROCESS |
| | 2 | INDUSTRIAL MACHINE30A | TOOL CLEARANCE PROCESS |
| | 3 | INDUSTRIAL MACHINE30A | TOOL RETRACTING PROCESS |
| | 4 | INDUSTRIAL MACHINE30A | CHUCK OFF PROCESS |
| | 5 | INDUSTRIAL MACHINE30B | MOVING PROCESS |

| ABNORMALITY TYPE | RECOVERY PROCESS NAME | RECOVERY PROCESS INFORMATION | | |
|---|---|---|---|---|
| | | EXECUTION ORDER | MACHINE NAME | PROCESS NAME |
| ERROR CODE 001 | RECOVERY MACRO X | 1 | INDUSTRIAL MACHINE30A | DOOR OPENING PROCESS |
| | | 2 | INDUSTRIAL MACHINE30A | TOOL CLEARANCE PROCESS |
| | | 3 | INDUSTRIAL MACHINE30A | TOOL RETRACTING PROCESS |
| | | 4 | INDUSTRIAL MACHINE30A | CHUCK OFF PROCESS |
| | | 5 | INDUSTRIAL MACHINE30B | MOVING PROCESS |

| PROCESS IN WHICH ABNORMALITY OCCURRED | RECOVERY PROCESS NAME | RECOVERY PROCESS INFORMATION ||| 
|---|---|---|---|---|
| | | EXECUTION ORDER | MACHINE NAME | PROCESS NAME |
| MACHINING PROCESS | RECOVERY MACRO X | 1 | INDUSTRIAL MACHINE30A | DOOR OPENING PROCESS |
| | | 2 | INDUSTRIAL MACHINE30A | TOOL CLEARANCE PROCESS |
| | | 3 | INDUSTRIAL MACHINE30A | TOOL RETRACTING PROCESS |
| | | 4 | INDUSTRIAL MACHINE30A | CHUCK OFF PROCESS |
| | | 5 | INDUSTRIAL MACHINE30B | MOVING PROCESS |

| STATE EXHIBITED WHEN ABNORMALITY OCCURRED | RECOVERY PROCESS NAME | RECOVERY PROCESS INFORMATION | | |
|---|---|---|---|---|
| | | EXECUTION ORDER | MACHINE NAME | PROCESS NAME |
| TORQUE VALUE: 12345 ROTATION SPEED: zrpm . . . | RECOVERY MACRO X | 1 | INDUSTRIAL MACHINE30A | DOOR OPENING PROCESS |
| | | 2 | INDUSTRIAL MACHINE30A | TOOL CLEARANCE PROCESS |
| | | 3 | INDUSTRIAL MACHINE30A | TOOL RETRACTING PROCESS |
| | | 4 | INDUSTRIAL MACHINE30A | CHUCK OFF PROCESS |
| | | 5 | INDUSTRIAL MACHINE30B | MOVING PROCESS |

| RECOVERY PROCESS NAME | RECOVERY PROCESS INFORMATION | | | RESTART PROCESS |
|---|---|---|---|---|
| | EXECUTION ORDER | MACHINE NAME | PROCESS NAME | |
| RECOVERY MACRO X | 1 | INDUSTRIAL MACHINE30A | DOOR OPENING PROCESS | CHUCKING PROCESS |
| | 2 | INDUSTRIAL MACHINE30A | TOOL CLEARANCE PROCESS | |
| | 3 | INDUSTRIAL MACHINE30A | TOOL RETRACTING PROCESS | |
| | 4 | INDUSTRIAL MACHINE30A | CHUCK OFF PROCESS | |
| | 5 | INDUSTRIAL MACHINE30B | MOVING PROCESS | |

PRODUCTION SYSTEM, RECOVERY SYSTEM, PRODUCTION METHOD, AND INFORMATION STORAGE MEDIUM

CROSS-REFERENCE TO RELATED APPLICATION

The present disclosure contains subject matter related to that disclosed in Japanese Patent Application JP 2019-226122 filed in the Japan Patent Office on Dec. 16, 2019 the entire contents of which are hereby incorporated by reference.

BACKGROUND OF THE INVENTION

1. Field of the Invention

The embodiments disclosed herein relate to a production system, a recovery system, a production method, and an information storage medium.

2. Description of the Related Art

There has been known a technology in which each of a plurality of processes is executed in a system including a plurality of industrial machines, for example, a programmable logic controller (PLC). For example, in JP 2012-194678 A1, there is described a technology in which a program is created by writing operations of the PLC in a ladder chart.

SUMMARY OF THE INVENTION

According to at least one aspect of the present invention, there is provided a production system including: an industrial machine configured to execute each of a plurality of processes; and a circuitry, the circuitry being configured to: detect an abnormality that has occurred in the industrial machine; receive a specification of one or more processes to be executed in order to perform recovery, based on process information associating, for each of the plurality of processes, at least a name of the each of the plurality of processes with a variable representing an operation of the industrial machine and indicating that at least one of refer or change is to be performed by a process program to be executed in the each of the plurality of processes, when the abnormality is detected; and record recovery process information indicating the received one or more processes.

BRIEF DESCRIPTION OF THE DRAWINGS

FIG. 7 is a table for showing a data storage example of a process database.

FIG. 8 is a table for showing a data storage example of a recovery process database.

FIG. 12 is a table for showing a data storage example of a recovery process database in Modification Example (1) of the present invention.

FIG. 13 is a table for showing a data storage example of a recovery process database in Modification Example (2) of the present invention.

FIG. 14 is a table for showing a data storage example of a recovery process database in Modification Example (3) of the present invention.

FIG. 15 is a table for showing a data storage example of a recovery process database in Modification Example (4) of the present invention.

DESCRIPTION OF THE EMBODIMENTS

According to a viewpoint of the inventors of the present invention, each time an abnormality occurs in an industrial machine configured to execute each of a plurality of processes, a user is required to manually perform recovery from the abnormality, which involves a lot of work and effort. As a result of extensive research and development for reducing the time and effort involved in recovery from abnormalities that have occurred in an industrial machine, the inventors of the present invention have conceived of a novel and original production system and the like. A detailed description is now given of the production system and the like according to at least one embodiment of the present invention.

1. Overall Configuration of Production System

Figure 1:
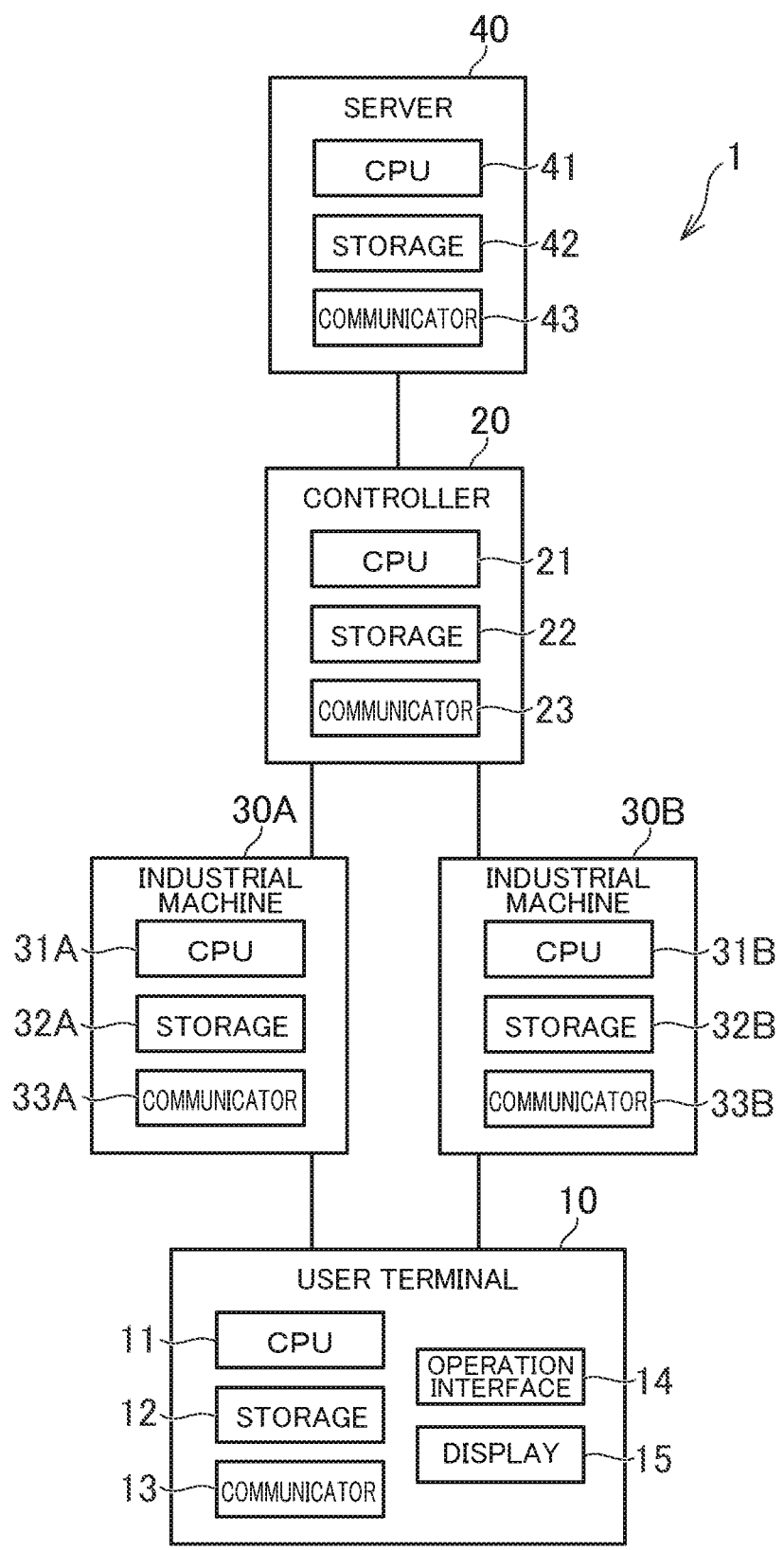
FIG. 1 is a diagram for illustrating an overall configuration of a production system according to at least one embodiment of the present invention.

FIG. 1 is a diagram for illustrating an example of an overall configuration of the production system according to at least one embodiment of the present invention. As illustrated in FIG. 1, a production system 1 includes a user terminal 10, a controller 20, industrial machines 30A and 30B, and a server 40. Each of those components is communicatively connected to each other by using any network, such as an Ethernet (trademark) or a dedicated communication standard for the industrial machines. In the following, when the industrial machines 30A and 30B are not particularly required to be distinguished from one another, the industrial machines 30A and 30B are simply referred to as "industrial machine 30." Similarly, when the CPUs 31A and 31B, the storages 32A and 32B, and the communicators 33A and 33B are not particularly required to be distinguished from one another, the CPUs 31A and 31B are simply referred to as "CPU 31," the storages 32A and 32B are simply referred to as "storage 32," and the communicators 33A and 33B are simply referred to as "communicator 33."

The user terminal 10 is a computer to be operated by the user. For example, the user terminal 10 is a personal computer, a mobile terminal (including a tablet terminal), or a cellular phone (including a smartphone). The user terminal 10 is not limited to those examples, and may be an operator terminal, a programming pendant, or a human machine interface (HMI), for example, a panel controller. The user terminal 10 includes a CPU 11, a storage 12, a communicator 13, an operation interface 14, and a display 15. The user terminal 10 can also be connected to each of the controller 20 and the server 40 (lines connecting those components are not shown in FIG. 1).

The CPU 11 includes at least one processor. The storage 12 includes a RAM and a hard disk drive, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is a computer configured to control at least one industrial machine 30. For example, the controller 20 may be a computer referred to as "PLC," or a computer having another name having the same function as that of the PLC. For example, the controller 20 and the industrial machine 30 as a whole may be referred to as "cell," which is a unit smaller than a line. In this case, the controller 20 may be referred to as "cell controller."

The controller 20 includes a CPU 21, a storage 22, and a communicator 23. The physical configuration of each of the CPU 21, the storage 22, and the communicator 23 may be the same as that of the CPU 11, the storage 12, and the communicator 13, respectively. The controller 20 is an example of a control device. Therefore, in at least one embodiment, the term "controller 20" can be read as "control device." The control device may be any device other than the controller 20. The controller 20 may control not only the industrial machine 30 but may also directly control devices that are under the direct control of the controller 20, for example, a robot and motors, and request the server 40 to analyze data showing results of operations of the industrial machine 30.

The industrial machine 30 is a device configured to execute a process. The industrial machine 30 may be any type of device, and is, for example, a robot controller, a lower device of the robot controller, an industrial robot, a motor controller, a lower device of the motor controller, a machine tool, a press machine, or a conveyance machine. The PLC is also a type of industrial machine. The industrial machine 30 includes a CPU 31, a storage 32, and a communicator 33. The physical configuration of each of the CPU 31, the storage 32, and the communicator 33 may be the same as that of the CPU 11, the storage 12, and the communicator 13, respectively.

The industrial machine 30 may also include other physical components. For example, the industrial machine 30 may include an integrated circuit for a specific application, which is referred to as "ASIC." Any physical component may be connected to the industrial machine 30. For example, a machine to be controlled, such as a motor or the like, a sensor for detecting an operation of a motor, a camera for photographing a state of a workpiece to be machined, an input/output device, or another industrial machine may be connected. In at least one embodiment, there is described a case in which the controller 20 controls two industrial machines 30, but the number of industrial machines 30 to be controlled by the controller 20 may be any number. For example, the controller 20 may control one machine, or may control three or more machines.

The server 40 is a server computer. The server 40 includes a CPU 41, a storage 42, and a communicator 43. The physical configuration of each of the CPU 41, the storage 42, and the communicator 43 may be the same as that of the CPU 11, the storage 12, and the communicator 13, respectively. For example, the server 40 collects data indicating results of operations of the controller 20 and the industrial machine 30, and analyzes the operations based on the collected data.

The programs and data described as being stored in each of the storages 12, 22, 32, and 42 may be supplied through the network. Moreover, the hardware configuration of each device is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

2. Outline of Production System

In at least one embodiment, the controller 20 is configured to store a system program for controlling the industrial machine 30. When the controller 20 and the industrial machine 30 as a whole are to be referred to as "cell," the system program may be referred to as "cell program." The system program is a program for controlling an execution order of processes by using variables. The execution order is the order in which the processes are to be executed.

The variable is information indicating that at least one of "refer" or "change" is to be performed when the process is executed. In at least one embodiment, a process program for executing a process is stored in the storage 32 of the industrial machine 30, and the variable indicates that at least one of "refer" or "change" is to be performed by the process program. The term "refer" indicates that a register corresponding to the variable is to be read. The term "change" indicates that the value of the register corresponding to the variable is to be rewritten.

The variable is used as an execution condition of the process, and a variable is prepared for each process. The term "variable" can also be referred to as "information indicating an operation of the industrial machine 30." For example, for each process, a start variable to be used as a process start condition, an abort variable to be used as an abort condition (temporary stop condition), or an end variable to be used as an end condition is prepared. In addition to those examples of the variable, there may be any variable, for example, a variable indicating that the process is in a busy state, a variable indicating an execution result of the process, a variable indicating an interim calculation, a variable indicating a setting of the industrial machine 30, or a variable indicating a detection result of a sensor. The variable may also be referred to as "input/output variable." The variable is referred to by the industrial machine 30 or other devices (for example, the controller 20).

The term "process" refers to a task or an operation performed by the industrial machine 30. The process may be composed of only one task or operation, or may be composed of a combination of a plurality of tasks or operations. The industrial machine 30 can execute a process depending on any use. For example, as a process, the industrial machine 30 can recognize a workpiece, grip a workpiece, open or close a door, set a workpiece, fix a workpiece to a machine tool, or machine a workpiece by using a machine tool. The industrial machine 30 executes at least one process. The industrial machine 30 may execute only one process or may execute a plurality of processes.

The process program is a program defining the individual procedures in the process. The process program can also be referred to as a program defining the operation of the industrial machine 30. The process program can be created in any language, and is created in, for example, a ladder language or a robot language. The language of the process program may differ depending on the industrial machine 30. For example, the process program of the industrial machine 30A may be described in a ladder language, and the process program of the industrial machine 30B may be described in a robot language. For example, in the process program, a start switch and a coil are written in the ladder chart and conditional branches are written in the source code such that the start variable becomes a condition for starting execution. Further, for example, in the process program, a command is written such that the end variable is changed when the last processing of the process ends. Moreover, for example, in the process program, a command is written such that the abort variable is changed when an abnormality occurs during execution of the process.

In at least one embodiment, a process program is prepared for each process, and the number of processes and the number of process programs is in a one-to-one relationship. Therefore, when a certain industrial machine 30 is to perform "n" ("n" is a natural number) processes, the industrial machine 30 stores at least "n" process programs. The number of processes and the number of process programs is not required to be in a one-to-one relationship. For example, a plurality of processes may be executed by one process program, and a plurality of process programs may be prepared in order to execute one process.

Figure 2:
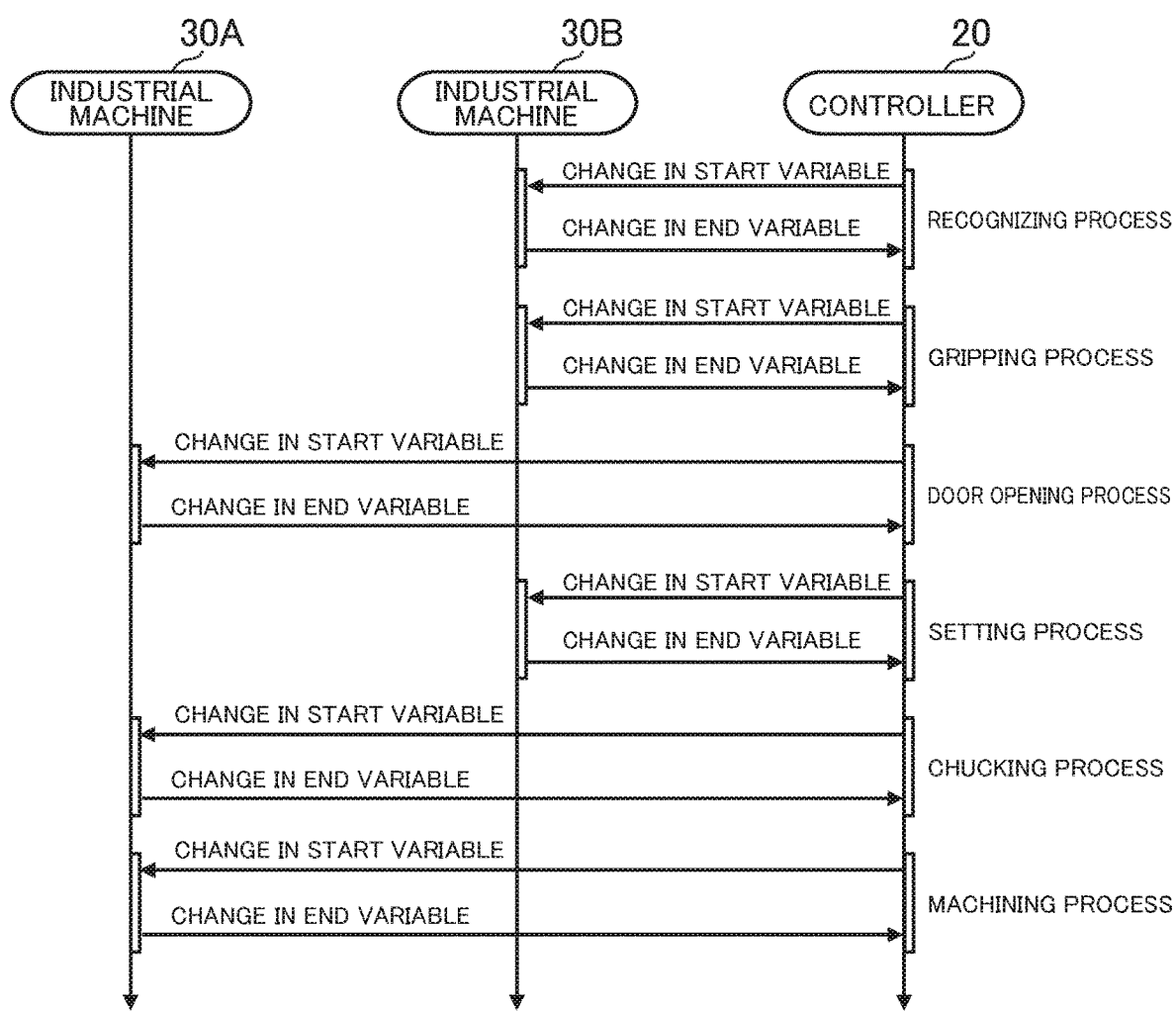
FIG. 2 is a diagram for illustrating how a controller controls an industrial machine.

FIG. 2 is a diagram for illustrating how the controller 20 controls the industrial machine 30. In at least one embodiment, as an example, there is described a case in which the industrial machine 30A is a machine tool and the industrial machine 30B is an industrial robot. For example, the processes are repeated periodically. In FIG. 2, there are illustrated processes to be executed within one cycle. The controller 20 executes the system program and causes the industrial machine 30B to execute a recognizing process as the first process in the cycle. The recognizing process is a process of recognizing a workpiece by using a sensor.

As described above, in at least one embodiment, a variable is prepared for each process, and the start of the process is controlled by the variable. Therefore, the controller 20 changes the start variable for starting the recognizing process to a predetermined value. The value is a value for starting the process, and is, for example, 1. An initial value (for example, 0) is set in the start variable, and the process is started when the start variable changes from the initial value to a predetermined value.

When the industrial machine 30B detects that the start variable of the recognizing process has been changed to the predetermined value, the industrial machine 30B executes the process program of the recognizing process and starts the recognizing process. When the recognizing process ends normally, the industrial machine 30B changes the end variable of the recognizing process to a predetermined value. The value is a value indicating the end of the process, and is, for example, 1. An initial value (for example, 0) is set in the end variable, and when the process ends, the initial value is changed to a predetermined value.

When the controller 20 detects that the end variable of the recognizing process has been changed to the predetermined value, the controller 20 changes the start variable of a gripping process to be performed next to a predetermined value. The gripping process is a process of gripping, by a robot hand, a recognized work piece and conveying the gripped workpiece to a predetermined position. When the industrial machine 30B detects that the start variable of the gripping process has been changed to the predetermined value, the industrial machine 30B executes the process program of the gripping process and starts the gripping process. When the gripping process ends normally, the industrial machine 30B changes the end variable of the gripping process to a predetermined value.

When the controller 20 detects that the end variable of the gripping process has been changed to the predetermined value, the controller 20 changes the start variable of a door opening process to be performed next to a predetermined value. The door opening process is a process of opening a door of the industrial machine 30A to insert the workpiece. When the industrial machine 30A detects that the start variable of the door opening process has been changed to the predetermined value, the industrial machine 30A executes the process program of the door opening process and starts the door opening process. When the door opening process ends normally, the industrial machine 30A changes the end variable of the door opening process to a predetermined value.

When the controller 20 detects that the end variable of the door opening process has been changed to the predetermined value, the controller 20 changes the start variable of a setting process to be performed next to a predetermined value. The setting process is a process of setting the workpiece in the opened door. When the industrial machine 30B detects that the start variable of the setting process has been changed to the predetermined value, the industrial machine 30B executes the process program of the setting process and starts the setting process. When the setting process ends normally, the industrial machine 30B changes the end variable of the setting process to a predetermined value.

When the controller 20 detects that the end variable of the setting process has been changed to the predetermined value, the controller 20 changes the start variable of a chucking process to be performed next to a predetermined value. The chucking process is a process of fixing the workpiece in order to perform machining. When the industrial machine 30A detects that the start variable of the chucking process has been changed to the predetermined value, the industrial machine 30A executes the process program of the chucking process and starts the chucking process. When the chucking process ends normally, the industrial machine 30A changes the end variable of the chucking process to a predetermined value.

When the controller 20 detects that the end variable of the chucking process has been changed to a predetermined value, the controller 20 changes the start variable of a machining process to be performed next to a predetermined value. The machining process is a process of machining the workpiece. When the industrial machine 30A detects that the start variable of the machining process has been changed to a predetermined value, the industrial machine 30A executes the process program of the machining process and starts the machining process. When the machining process ends normally, the industrial machine 30A changes the end variable of the machining process to a predetermined value.

Through performing the processes described above, all of the processes in a cycle are completed. When the controller 20 detects that the end variable of the machining process has been changed to a predetermined value, the controller 20 changes the start variable of the recognizing process to a predetermined value in order to start the next cycle. After that, the next cycle is started in the same manner as in the first cycle. The start variable and end variable of each process each return to their respective initial values at a predetermined timing, for example, at the end of the cycle.

When an abnormality occurs in the processes executed by each industrial machine 30, the execution of the process is aborted, and the abort variable is changed to a predetermined value. The process of detecting the occurrence of an abnormality is written in the process program. For example, the industrial machine 30A changes the abort variable of the door opening process to the predetermined value when the door does not open in the door opening process. Further, for example, the industrial machine 30B changes the abort variable of the gripping process to the predetermined value when the workpiece is not gripped in the gripping process.

When the controller 20 detects that the abort variable of any of the processes has been changed to the predetermined value, the controller 20 transmits, to the user terminal 10, an abnormality occurrence notification indicating that the abnormality has occurred. In at least one embodiment, there is described a case in which the abnormality occurrence notification is transmitted by using electronic mail, but the notification may be performed by using another medium. For example, the abnormality occurrence notification may be performed by using a push notification, a notification in an engineering tool, or a message application.

Further, for example, the abnormality occurrence notification is not limited to output of information to the user terminal 10, and the abnormality occurrence notification may be performed by another method. For example, the controller 20 may include alight emitter, for example, an LED light, and the light emitter may be configured to perform the abnormality occurrence notification by emitting light. Moreover, for example, the abnormality occurrence notification is not limited to a visual notification, and may be an aural or a tactile notification. For example, the abnormality occurrence notification may be performed by using an alarm sound output from a speaker or by using vibrations from a vibrator.

When the user confirms the abnormality occurrence notification, the user connects the user terminal 10 to the industrial machine 30 to perform recovery from the abnormality. The user terminal 10 and the industrial machine 30 may be connected by wire or wirelessly. In at least one embodiment, as an example, there is described a procedure for performing recovery from an abnormality that has occurred in a machining process of the industrial machine 30A. For example, when the user activates the engineering tool installed on the user terminal 10, a recovery process creation screen for performing recovery from the abnormality is displayed.

Figure 3:
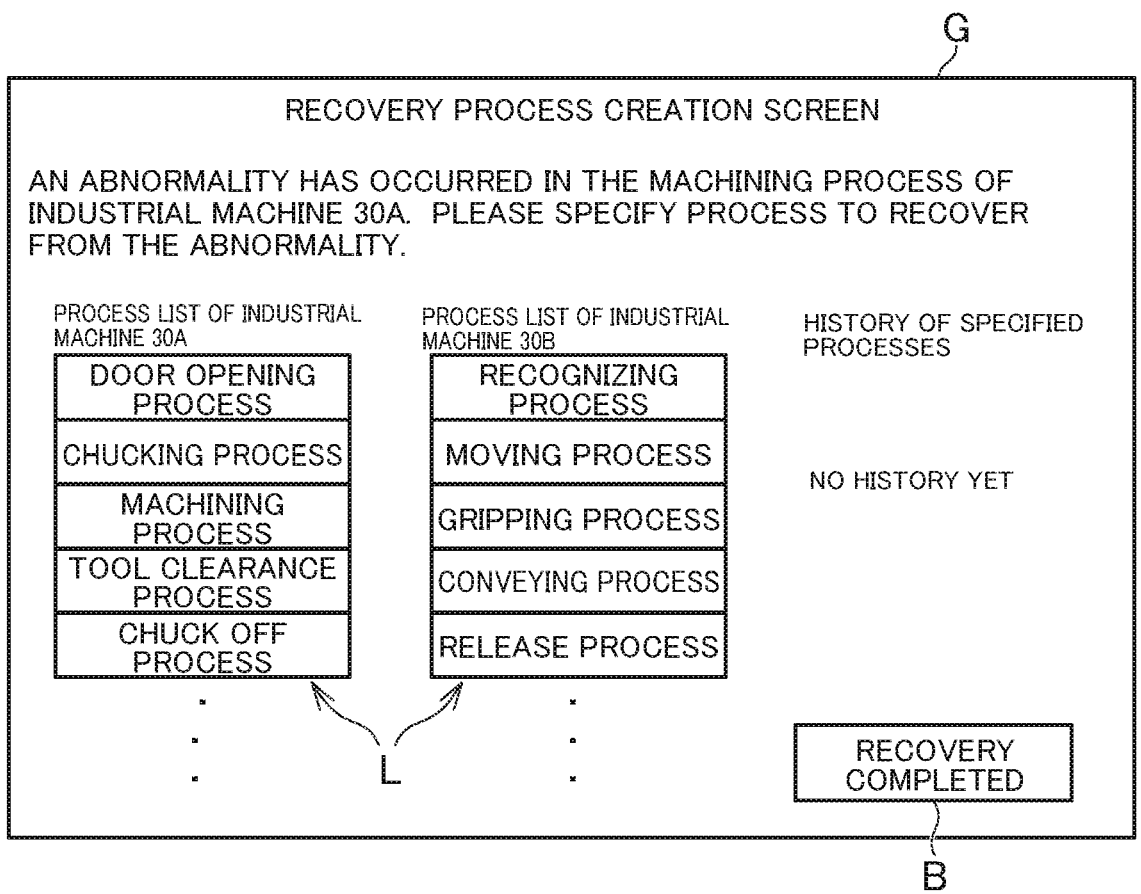
FIG. 3 is a diagram for illustrating an example of a recovery process creation screen.

FIG. 3 is a diagram for illustrating an example of a recovery process creation screen. As illustrated in FIG. 3, a list L of processes executable by the industrial machine 30 is displayed on a recovery process creation screen G. For example, the list L displays the names of all the processes that can be executed by each of the industrial machine 30A and the industrial machine 30B. The list L may display not only the names of the processes to be executed in the cycle, but also the names of other processes. For example, the list L is not limited to displaying the name of a process to be executed in order to perform recovery from an abnormality, but also the names of processes that are not particularly used in abnormality recovery.

The user specifies at least one process from the recovery process creation screen G, and performs recovery from an abnormality that has occurred in the industrial machine 30. The user can specify any process in the list L. For example, the user may specify processes of both the industrial machine 30A and the industrial machine 30B, or may specify a process of any one of the industrial machine 30A and the industrial machine 30B. Each of the industrial machine 30A and the industrial machine 30B executes the process(es) selected by the user.

Figure 4:
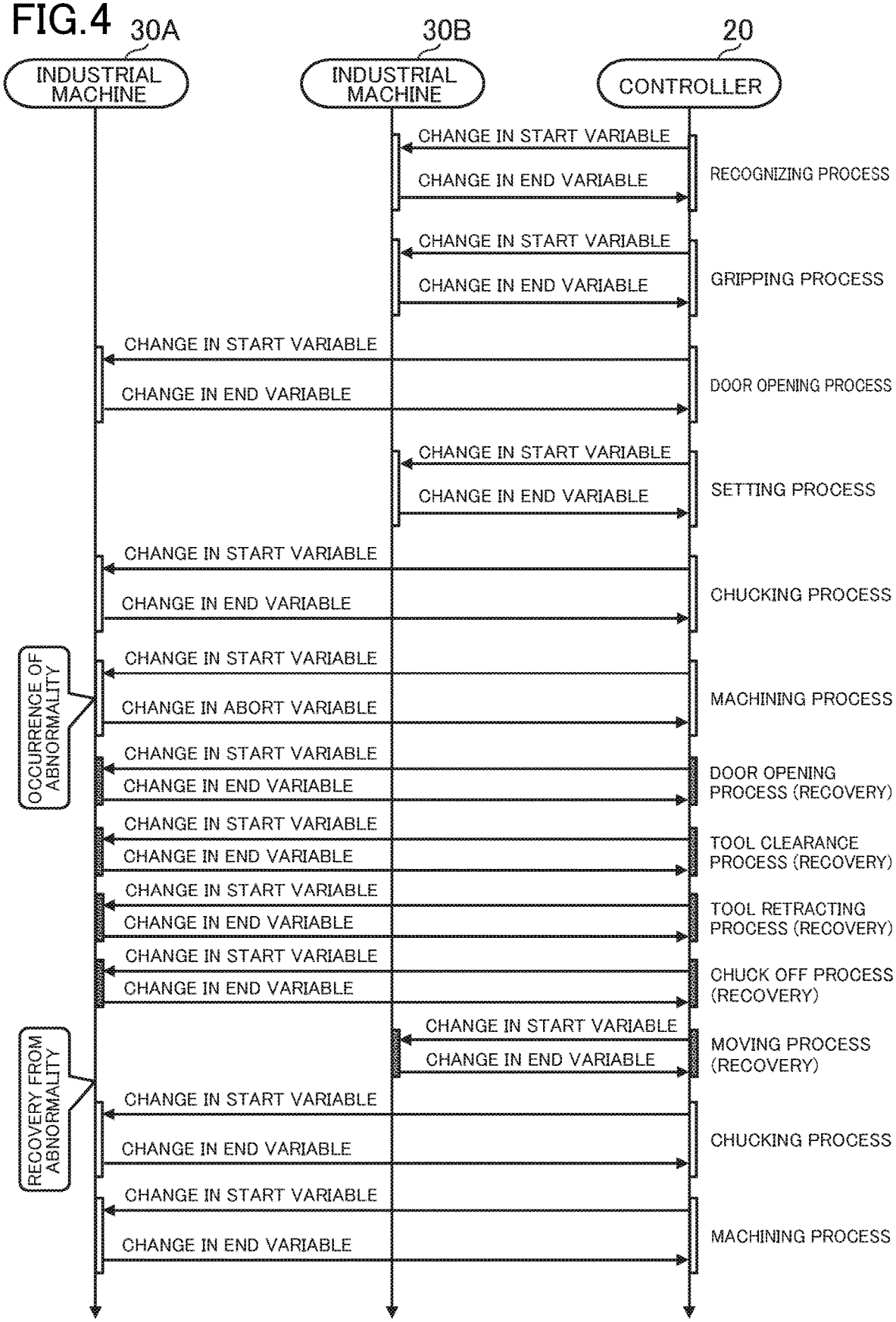
FIG. 4 is a diagram for illustrating how a user manually performs recovery from an abnormality.

FIG. 4 is a diagram for illustrating how a user manually performs recovery from an abnormality. As illustrated in FIG. 4, for example, the user selects, from the recovery process creation screen G, the door opening process, a tool clearance process, a tool retracting process, and a chuck OFF process of the industrial machine 30A. The tool clearance process and the tool retracting process are each a process for moving a machining tool included in the industrial machine 30A. The chuck OFF process is a process for releasing a chucked state. The industrial machine 30A executes each process in the order specified by the user.

Then, the user selects a moving process of the industrial machine 30B from the recovery process creation screen G. The moving process is a process for moving the robot hand. The industrial machine 30B executes the moving process in accordance with an instruction by the user. When the user confirms that the abnormality has been recovered from, the user selects a "recovery completed" button B from the recovery process creation screen G. When the user selects the "recovery completed" button B, the abort variable of the machining process is returned to the initial value, and the cycle is restarted. In the example of FIG. 2, there is illustrated a case in which the cycle is restarted from the chucking process, which is the process immediately before the machining process in which the abnormality occurred.

In at least one embodiment, when the user manually performs recovery from the abnormality, the process specified at that time is recorded in the server 40 as recovery process information. The recovery process information in at least one embodiment, which is described in detail later, is a macro for executing the processes specified by the user in an execution order of the processes. The recovery process information recorded in the server 40 is called by the controller 20 when the abnormality occurs again in the industrial machine 30. The controller 20 performs recovery from the abnormality by executing, based on the recalled recovery process information, the processes by using a procedure specified by the user in the past. The recovery may be executed automatically, or may be executed after the user is asked whether or not to perform recovery.

Figure 5:
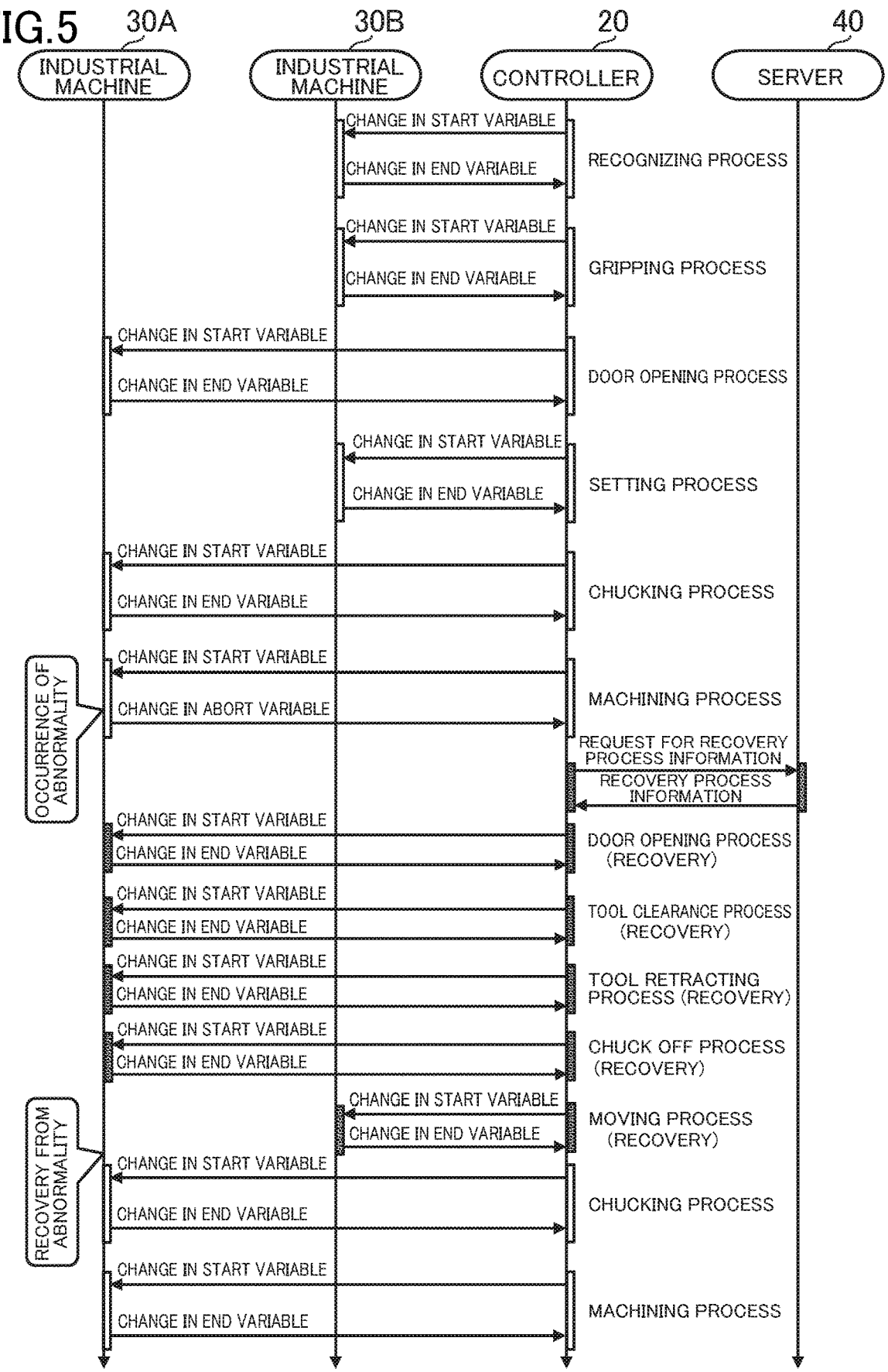
FIG. 5 is a diagram for illustrating how recovery is performed from an abnormality based on recovery process information.

FIG. 5 is a diagram for illustrating how recovery is performed from an abnormality based on recovery process information. As illustrated in FIG. 5, when the abnormality occurs again in the machining process of the industrial machine 30A, the controller 20 requests the recovery process information from the server 40. The server 40 transmits recovery process information registered in the past to the controller 20. The controller 20 causes the industrial machine 30A to execute the door opening process, the tool clearance process, the tool retracting process, and the chuck OFF process based on a recovery procedure received from the server 40, and causes the industrial machine 30B to execute the moving process. Then, when the controller 20 detects that the abort variable of the machining process has been returned to the initial value, the controller 20 changes the start variable of the chucking process to a predetermined value and restarts the cycle.

As described above, in the production system 1 of at least one embodiment, the work and effort involved in recovery from an abnormality that has occurred in the industrial machine 30 is reduced by recording recovery process information in the server 40, and calling the recovery process information by the controller 20 when the abnormality occurs again in the industrial machine 30. Details of the production system 1 of at least one embodiment are now described.

3. Functions to be Implemented in Production System

Figure 6:
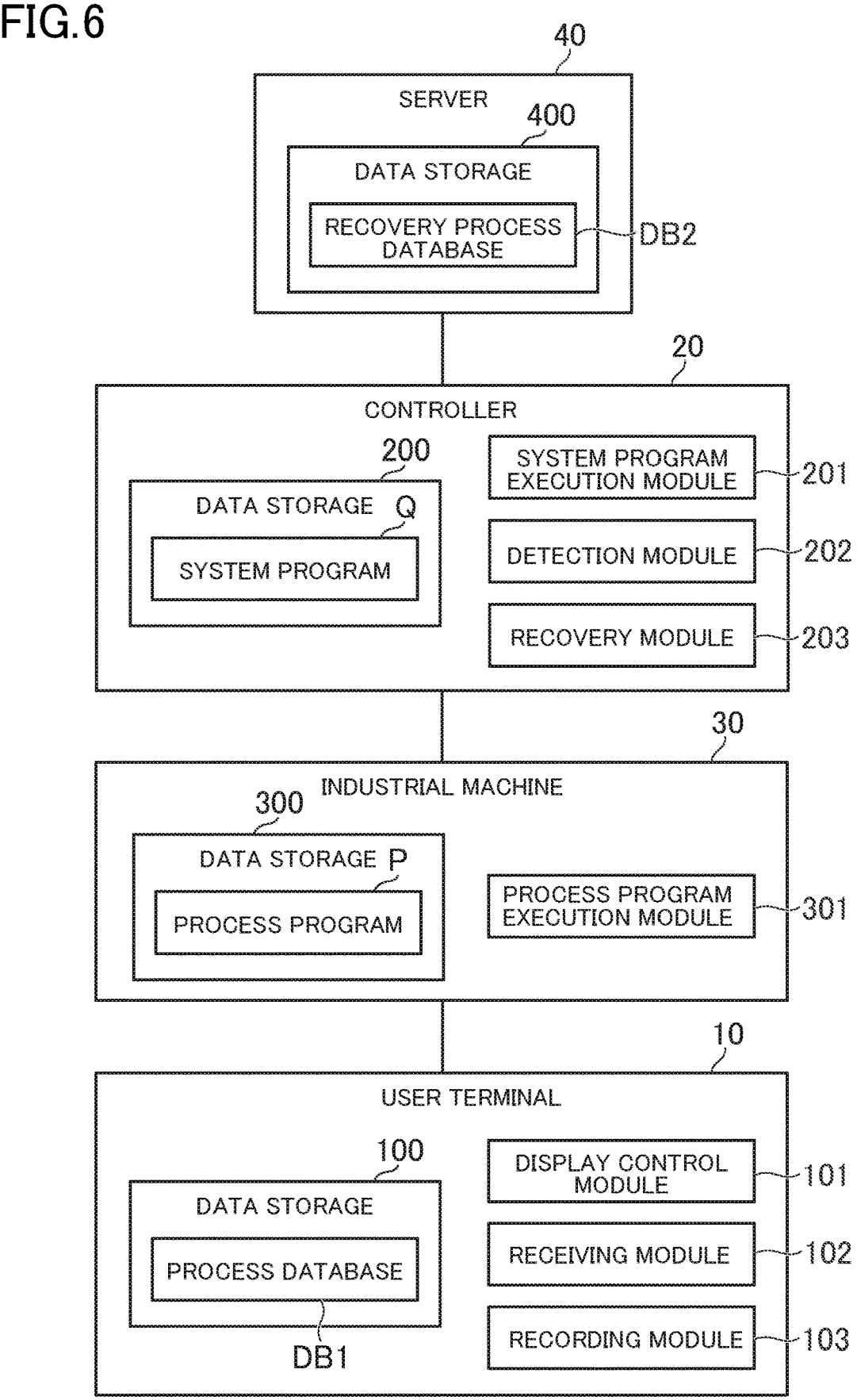
FIG. 6 is a functional block diagram for illustrating functions to be implemented in the production system.

FIG. 6 is a functional block diagram for illustrating functions to be implemented in the production system 1. In at least one embodiment, functions to be implemented in each of the user terminal 10, the controller 20, the industrial machine 30, and the server 40 are described. The same functions are implemented in each of the industrial machines 30A and 30B, and therefore the industrial machines 30A and 30B are illustrated as one industrial machine 30 in FIG. 6.

[3-1. Functions to be Implemented in User Terminal]

As illustrated in FIG. 6, in the user terminal 10, a data storage 100, a display control module 101, a receiving module 102, and a recording module 103 are implemented.

[Data Storage]

The data storage 100 is mainly implemented by the storage 12. The data storage 100 is configured to store the data required for recording the recovery process information in the server 40. For example, the data storage 100 stores a process database DB1.

FIG. 7 is a table for showing a data storage example of the process database DB1. As shown in FIG. 7, the process database DB1 is a database in which process information on each process is stored. For example, the process database DB1 stores the name of the industrial machine 30 and the process information of the processes executed by the industrial machine 30.

The process information is the basic information on a process. The content of the process information may be specified by the user or set by a tool for generating a process program P. For example, when the process program P of a new process is to be created, the process information on the new process is registered in the process database DB1. The process information may be editable after being registered in the process database DB1.

In at least one embodiment, there is described a case in which the process information on all the industrial machines 30 to be controlled by the controller 20 is stored in the process database DB1, but only the process information on a part of the industrial machines 30 may be stored in the process database DB1. Further, there is described a case in which the process information on all of the processes that can be executed by the industrial machine 30 is stored in the process database DB1, but only the process information on a part of the processes may be stored in the process database DB1. For example, the process name and the variable name are stored in the process information.

The process name is the name specified when the process program P is created. The process name may be any name that can uniquely identify the process in the industrial machine 30, and may even be the same as the name of a process in another industrial machine 30. For example, the process name may be specified by the user or may be automatically conferred based on a predetermined rule. Further, the process name may be anything that can uniquely identify the process, for example, an ID of the process.

The variable name is the name set when the process program P is created. For example, the names of each of the start variable, the abort variable, and the end variable of the process are stored in the process information. Any variable may be specified for a process, and in this case, the variable name specified by the user may be stored in the process information. In at least one embodiment, the variable name includes the name of the process (a character string, for example, "A1") and a character string indicating the type of the variable (a character string, for example, "Start"). The same variable name is not used between processes.

The variable name can be set based on any rule, and is not limited to the example of at least one embodiment. For example, the variable name may include the name of the industrial machine (a character string, for example, "Equip A"), which allows identification of which industrial machine 30 the variable is for. Further, for example, the variable name may be defined by a character string that can uniquely identify the variable in the production system 1 or the industrial machine 30 without particularly including the name of the industrial machine 30 or the process name. The variable name can be, like in the case of the process name, a name that can uniquely identify the variable, for example, an ID of the variable.

Further, for example, the names of the variables managed by the controller 20 and the names of the variables managed by the industrial machine 30 may be different. That is, the name used by the controller 20 to identify the variable and the name used by the industrial machine 30 to identify the variable may be different. In a case where the name used by the controller 20 to identify the variable is referred to as "system variable" and the name used by the industrial machine 30 to identify the variable is referred to as "machine variable," the data storage 100 stores a table or a database for converting between the system variables and the machine variables. When the controller 20 refers to the variable of the industrial machine 30, the system variable is converted into the machine variable, and the register corresponding to the machine variable is read. Similarly, when the controller 20 changes the variable of the industrial machine 30, the system variable is converted into the machine variable.

The content included in the process information is not limited to the example described above. The process information may include other information on the process. For example, the process information may include an estimated time period required in order to execute the process. As another example, the process information may include the execution order of the process. Further, for example, the process information may include a process start condition and a change condition of each variable.

The data to be stored in the data storage 100 is not limited to the example described above. For example, the data storage 100 may store image data of an image displayed on the recovery process creation screen G, or may store an engineering tool. Further, for example, the data storage 100 may store a created process program P and system program Q. Moreover, for example, the data storage 100 may store the recovery process information registered in the server 40.

[Display Control Module]

The display control module 101 is mainly implemented by the CPU 11. When a detection module 202 detects an abnormality, the display control module 101 displays, based on the process information on each of a plurality of processes, a recovery process creation screen G that includes the names of each of the plurality of processes and that can be used to specify the process to be executed in order to perform recovery. In at least one embodiment, the process information on each process is stored in the process database, and therefore the display control module 101 displays the recovery process creation screen G based on the process database.

The recovery process creation screen G includes a user interface configured to receive a specification of at least one process. In other words, the recovery process creation screen G receives a specification of at least one process to be executed during recovery. The recovery process creation screen Gin at least one embodiment has a layout like that illustrated in FIG. 3. For example, the display control module 101 refers to the process database, and displays the list L showing the names of all the processes on the recovery process creation screen G. It is not required that the list L display the names of all the processes for which process information is stored in the process database, and the list L may display only the names of apart of those processes.

The layout of the recovery process creation screen G is not limited to the layout illustrated in FIG. 3, and may be any layout. For example, the recovery process creation screen G may receive a selection of a process in a pull-down format or a drum roll format. As another example, the recovery process creation screen G may have a layout in which processes are arranged in chronological order in a flowchart format, or a layout in which input of the process name is received in a tabular format. Further, for example, on the recovery process creation screen G, input forms for inputting the name of the actual process may be arranged.

[Receiving Module]

The receiving module 102 is mainly implemented by the CPU 11. The receiving module 102 is configured to receive, when the detection module 202 detects an abnormality, for each of a plurality of processes, a specification of one or more of the processes to be executed in order to perform recovery, based on process information associating at least a name of each process with a variable representing an operation of the industrial machine 30 and indicating that at least one of "refer" or "change" is to be performed by the process program P to be executed in the process.

The process to be executed in order to perform recovery is the process required for recovery from the abnormality detected by detection module 202. In other words, the process to be executed in order to perform recovery is the process specified by the user when the user manually performs recovery from an abnormality. The process to be executed in order to perform recovery may be one process or a plurality of processes. The number of processes to be executed in order to perform recovery may have an upper limit, or may not have a particular upper limit. The receiving module 102 receives the specification of the process(es) based on a detection signal of the operation interface 14.

In at least one embodiment, the process (es) is (are) specified from the recovery process creation screen G, and therefore the receiving module 102 receives a specification of one or more processes on the recovery process creation screen G. For example, the receiving module 102 receives the specification of one or more processes from among the processes displayed in the list L of the recovery process creation screen G. The receiving module 102 may repeatedly receive a specification of the same process. Further, for example, the receiving module 102 may receive only a specification of processes of one industrial machine 30, or may receive a specification of various processes of each of a plurality of industrial machines 30.

For example, when the user specifies a plurality of processes, the receiving module 102 receives a specification of the execution order of the plurality of processes. In at least one embodiment, the user repeatedly specifies processes in the list L, and therefore the order in which the processes are specified corresponds to the execution order. That is, the receiving module 102 receives the specification of the execution order by repeatedly receiving a specification of the processes in the list L. The order in which the specification of the processes is received becomes the execution order as it is.

The specification of the execution order is not limited to the example of at least one embodiment, and may be performed by using any operation. For example, the receiving module 102 may receive the specification of the execution order by receiving input of a numerical value indicating the execution order. Further, for example, when the recovery process creation screen G has the form of a flowchart, the receiving module 102 may receive the specification of the execution order by receiving an operation of specifying the order of the processes.

In at least one embodiment, the process(es) to be executed during recovery can be specified even for an industrial machine 30 other than the industrial machine 30 in which the abnormality occurred. In the example of FIG. 3, on the recovery process creation screen G, the processes of the industrial machine 30B in charge of the processes before the machining process of the industrial machine 30A in which the abnormality occurred can also be specified. The receiving module 102 receives the specification of one or more processes to be executed by at least one of the industrial machine 30A or another industrial machine 30B based on the process information on each of the industrial machine 30A in which the detection module 202 detected the abnormality and the another industrial machine 30B executing the processes before those of the industrial machine 30A. The receiving module 102 may receive a specification of the processes of both the industrial machine 30A and the industrial machine 30B, or may receive a specification of the processes of only any one of the industrial machine 30A and the industrial machine 30B.

[Recording Module]

The recording module 103 is mainly implemented by the CPU 11. The recording module 103 is configured to record recovery process information indicating the one or more processes received by the receiving module 102. The recovery process information is information for identifying the processes specified by the user during abnormality recovery. In other words, the recovery process information is information indicating execution results of the processes for performing recovery from the abnormality. In at least one embodiment, there is described a case in which the recovery process information is data having the form of a macro, but the recovery process information may have any data format. For example, the recovery process information may have a text format, a document format, or a CSV format. In addition, for example, a program for changing the start variable of the processes specified by the user one after another may be automatically generated, and the generated program may be recorded as the recovery process information.

In at least one embodiment, there is described a case in which the recording module 103 records the recovery process information in another device (for example, the server 40) communicable to and from the controller 20 controlling the industrial machine 30, but the recording module 103 may record the recovery process information in another computer or an information storage medium. The another device in which the recovery process information is recorded is not limited to the server 40. For example, the recording module 103 may record the recovery process information in the user terminal 10, the controller 20, or the industrial machine 30, or may record the recovery process information in another computer (not shown), for example, a database server or a simulation server.

For example, in a case where the user specifies a plurality of processes, the recording module 103 records the recovery process information based on the execution order received by the receiving module 102. In this case, the execution order specified by the user and the name of each process are stored in the recovery process information in association with each other. That is, the recording module 103 records the recovery process information such that each process specified by the user can be executed in the execution order specified by the user.

In at least one embodiment, execution of the processes is controlled based on a variable, and therefore the recording module 103 generates the recovery process information such that the start variable of each process has a predetermined value in the execution order specified by the user. In the data storage example of FIG. 8 described later, the recording module 103 creates the recovery process information such that the start variable of the door opening process is set to a predetermined value. Further, the recording module 103 creates the recovery process information such that when the end variable of the door opening process becomes a predetermined value, the start variable of the tool clearance process to be performed next is a predetermined value. In the subsequent processes as well, the recording module 103 creates the recovery process information in a similar manner so as to change the start variable of the next process to a predetermined value when the end variable of a certain process becomes a predetermined value. In at least one embodiment, recovery process information in which the commands for changing the values of those variables are written as a macro is generated.

Further, for example, the recording module 103 records recovery process information indicating the one or more processes to be executed by at least one of the industrial machine 30A or another industrial machine 30B. That is, when the user specifies processes of each of a plurality of industrial machines 30, the recording module 103 generates the recovery process information such that the processes specified by the user are executed by the respective industrial machines 30. In the data storage example of FIG. 8 described later, the recording module 103 generates the recovery process information such that the industrial machine 30B executes the moving process after the industrial machine 30A has executed four processes including the door opening process and other processes. As described above, in the recovery process information, the commands for changing the start variable of each process are written as a macro.

In at least one embodiment, when the recovery process information is recorded by the recording module 103, the user terminal 10 changes the system program Q such that the recovery process information is called when an abnormality occurs. For example, when an abnormality occurs, the user terminal 10 adds, for example, a trajectory switch or a coil for requesting the recovery process information from the server 40 to the ladder chart of the system program Q, or adds a command indicating the request to the source code of the system program Q. Through changing the system program Q, the recovery process information is called when the abnormality occurs again.

[3-2. Functions to be Implemented in Controller]

As illustrated in FIG. 6, in the controller 20, a data storage 200, a system program execution module 201, a detection module 202, and a recovery module 203 are implemented.

[Data Storage]

The data storage 200 is mainly implemented by the storage 22. The data storage 200 is configured to store the data required in order to control the process execution order. For example, the data storage 200 stores the system program Q. As described above, in the system program Q, commands are written such that the start variable of each process has a predetermined value in the execution order determined in advance. The system program Q stored in the data storage 200 is created by the user terminal 10. Further, for example, the data storage 200 may store information on the name and an IP address, for example, of each of the industrial machines 30A and 30B to be controlled by the controller 20. Moreover, for example, the data storage 200 may store the process database DB1. In addition, for example, the data storage 200 may store the values of the variables of each industrial machine 30. In this case, it is assumed that the variables of the data storage 200 and the variables of the data storage 300 are periodically matched.

[System Program Execution Module]

The system program execution module 201 is mainly implemented by the CPU 21. The system program execution module 201 is configured to control the process execution order based on the system program Q. For example, the system program execution module 201 transmits a start instruction of each process to each industrial machine 30 such that the industrial machines 30 operate in the execution order specified by the user. For example, the system program execution module 201 changes the start variable of the first process to a predetermined value when the system program Q is executed. The system program execution module 201 periodically refers to the end variable of each industrial machine 30, and when the change variable of a certain process becomes a predetermined value, changes the start variable of the next process to a predetermined value. The system program execution module 201 returns the start variable of the next process to the initial value at an appropriate timing after the start of the next process. The execution order of the subsequent processes is controlled by the same processing.

[Detection Module]

The detection module 202 is mainly implemented by the CPU 21. The detection module 202 is configured to detect abnormalities that occur in the industrial machine 30. In at least one embodiment, when an abnormality occurs in a process, the process program P changes the abort variable of the process to a predetermined value. The detection module 202 refers to the value of the abort variable of each process, and determines whether or not the value has become the predetermined value. The detection module 202 determines that an abnormality has occurred in processes in which the abort variable has become the predetermined value.

The method of detecting an abnormality is not limited to a method using a variable, and a known method can be applied as the method of detecting an abnormality itself. For example, the detection module 202 may determine that an abnormality has occurred when a certain process has not ended by a certain period of time, or the detection module 202 may determine that an abnormality has occurred when a detection signal of a sensor connected to the controller 20 or the industrial machine 30 shows an abnormal value.

Further, for example, the industrial machine 30 may transmit a predetermined abnormality occurrence notification to the controller 20 when an abnormality occurs. The abnormality occurrence notification may include any information, for example, the name of the industrial machine 30 in which the abnormality has occurred, the name of the process in which the abnormality has occurred, the type of the abnormality that has occurred, and the date and time at which the abnormality occurred. The detection module 202 determines whether or not the abnormality occurrence notification has been received from the industrial machine 30. The detection module 202 determines that an abnormality has occurred when the abnormality occurrence notification has been received.

[Recovery Module]

The recovery module 203 is mainly implemented by the CPU 21. The recovery module 203 is configured to acquire, when the detection module 202 again detects the abnormality, the one or more processes indicated by the recovery process information recorded by the recording module 103, and to perform recovery from the abnormality by executing the acquired one or more processes. In at least one embodiment, the process(es) specified by the user when the abnormality occurred in the past is (are) indicated in the recovery process information, and therefore the recovery module 203 executes the process(es) in accordance with the procedure described in the recovery process information to perform recovery from the abnormality. Similarly to normal processes, the execution of the processes during recovery is controlled by using the process program P and the variables, and therefore the recovery module 203 executes the process (es) based on the variable (s) of the process (es) indicated in the recovery process information.

For example, when a plurality of processes are to be executed in a predetermined order, the recovery module 203 transmits to the industrial machine 30 an instruction to change the start variable of the first process to a predetermined value. When the industrial machine 30 detects a change in a variable, the industrial machine 30 executes the first process. When the first process ends normally, the industrial machine 30 changes the end variable of the process to a predetermined value. When the recovery module 203 detects that the end variable of the first process has become the predetermined value, the recovery module 203 transmits to the industrial machine 30 an instruction to change the start variable of the second recovery process to a predetermined value. The subsequent processes are executed in the same manner in order until the last process indicated in the recovery process information.

[3-3. Functions to be Implemented in Industrial Machine]

As illustrated in FIG. 6, in the industrial machine 30, a data storage 300 and a process program execution module 301 are implemented.

[Data Storage]

The data storage 300 is mainly implemented by the storage 32. The data storage 300 is configured to store the data required for the industrial machine 30 capable of executing each of a plurality of processes to execute each process. For example, the data storage 300 stores the process program P. In at least one embodiment, process information is prepared for each process program P, and therefore the data storage 300 may store the process program P and the process information in association with each other. Further, the data storage 300 stores the value of the variable of each process. As described above, it is assumed that the variables of the data storage 300 and the variables of the data storage 200 are consistent with each other. Moreover, the data storage 300 may store, for example, parameters for controlling the motor and teaching data of the robot.

[Process Program Execution Module]

The process program execution module 301 is mainly implemented by the CPU 31. The process program execution module 301 is configured to execute each process based on the process program P and the variables stored in the data storage 300. For example, the start variable of each process is changed to a predetermined value based on an instruction received from the controller 20, and the process program execution module 301 starts the process when the change is detected. Further, for example, the process program execution module 301 changes the end variable of the process to a predetermined value when the last processing written in the process program P of the process has ended. When the system program Q detects that the end variable of the process has become the predetermined value, the start variable of the next process is changed to a predetermined value, and the process program execution module 301 starts executing the process program P of the next process. Each of the subsequent processes is executed in sequence based on the same processing.

[3-4. Functions to be Implemented in Server]

As illustrated in FIG. 6, a data storage 400 is implemented in the server 40. The data storage 400 is mainly implemented by the storage 32. The data storage 400 is configured to store recovery process information. For example, the data storage 400 stores a recovery process database DB2 in which at least one piece of recovery process information is stored. When the server 40 receives recovery process information from the user terminal 10, the server 40 stores the received recovery process information in the recovery process database DB2.

FIG. 8 is a table for showing a data storage example of the recovery process database DB2. As shown in FIG. 8, the recovery process database DB2 stores apiece of recovery process information for each name of the recovery process information. For example, the process execution order, the name of the industrial machine 30 to execute the processes, and the names of the processes are stored in the recovery process information. In FIG. 8, the content of the recovery process information is shown in a table, but in at least one embodiment, the recovery process information is written as a macro, and therefore the relationships between the pieces of information are written as macro commands. That is, commands are written in the recovery process information so as to change the start variable to a predetermined value in order of the door opening process, the tool clearance process, the tool retracting process, the chuck OFF process, and the moving process.

4. Processing to be Executed in Production System

Figure 9:
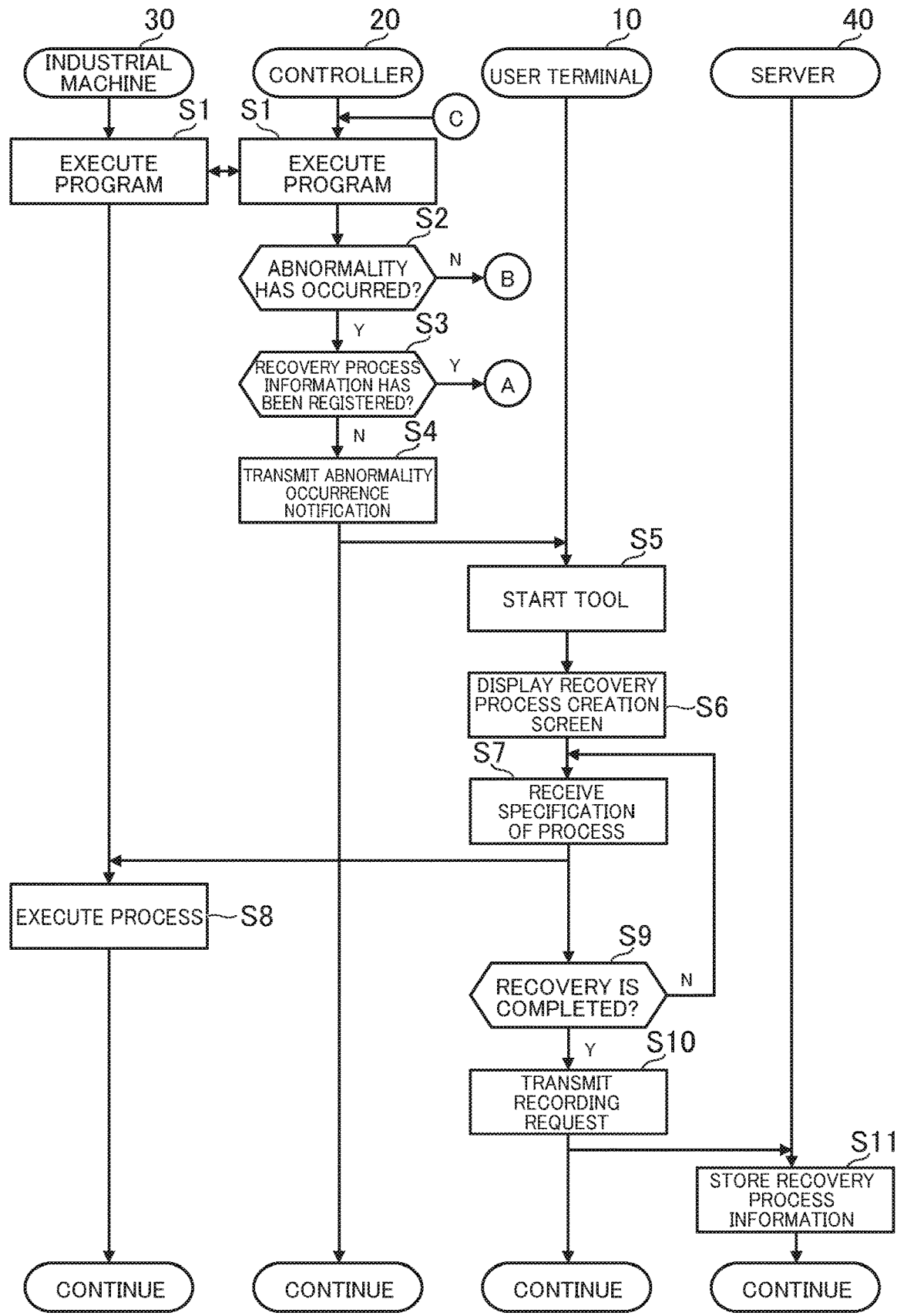
FIG. 9 is a flowchart for illustrating processing to be executed in the production system.
Figure 10:
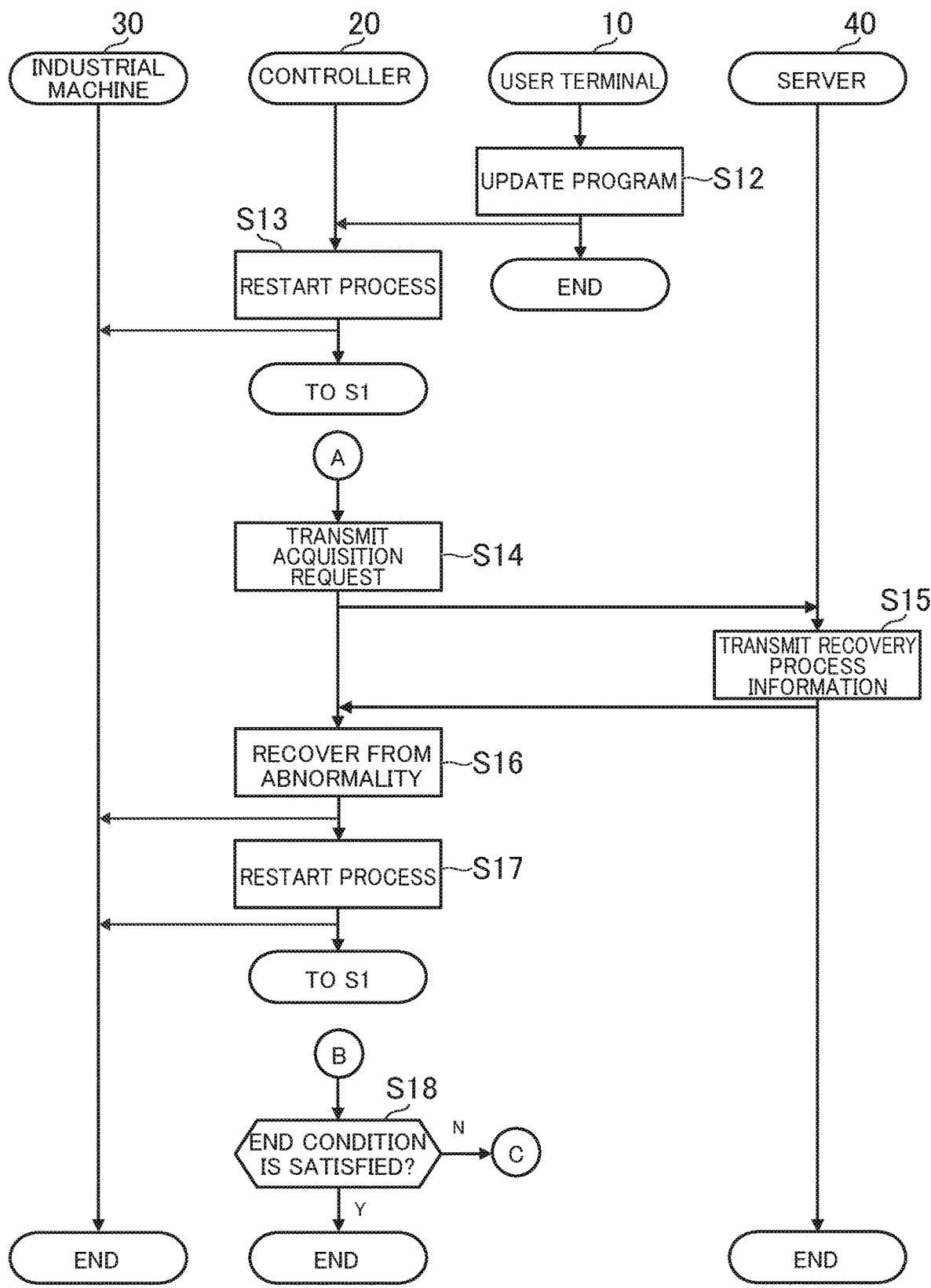
FIG. 10 is a flowchart for illustrating the processing to be executed in the production system.

FIG. 9 and FIG. 10 are flowcharts for illustrating processing to be executed in the production system 1. The processing illustrated in FIG. 9 and FIG. 10 is executed by each of the CPUs 11, 21, 31, and 41 operating in accordance with programs stored in the storages 12, 22, 32, and 42, respectively. The processing illustrated in FIG. 9 and FIG. 10 is an example of the processing executed by the functional blocks illustrated in FIG. 6.

As illustrated in FIG. 9, each process is executed by the controller 20 executing the system program Q and the industrial machine 30 executing the process program P (Step S1). In Step S1, the controller 20 executes the system program Q, and changes the start variable of a certain process to a predetermined value. The industrial machine 30 executing the process changes the end variable to a predetermined value when the process is completed normally. When the controller 20 detects the change in the end variable to the predetermined value, the controller 20 changes the start variable of the next process to a predetermined value. Each of the subsequent processes in one cycle is executed in the same manner. When an abnormality occurs in any of the processes, the industrial machine 30 executing the process aborts the process and changes the abort variable of the process to a predetermined value.

The controller 20 determines whether or not an abnormality has occurred in any of the processes (Step S2). In Step S2, the controller 20 refers to the abort variable of each process, and determines whether or not there is an abort variable having a predetermined value. The controller 20 determines that an abnormality has occurred when there is even one process in which the abort variable has the predetermined value.

When it is determined that an abnormality has occurred (Step S2: Y), the controller 20 determines, based on the system program Q, whether or not recovery process information has been registered (Step S3). When recovery process information has been registered, based on the processing of Step S12 described later, a command to acquire the registered recovery process information is written in the system program Q. In Step S3, the controller 20 determines whether or not the command is written in the system program Q.

When it is not determined that recovery process information has been registered (Step S3: N), the controller 20 transmits an abnormality occurrence notification to the user terminal 10 (Step S4). In Step S4, the controller 20 uses electronic mail, for example, to transmit an abnormality occurrence notification having a predetermined format. It is assumed that the abnormality occurrence notification includes information on, for example, the name of the process in which the abnormality has occurred, the name of the industrial machine 30 executing the process, and the date and time at which the abnormality occurred.

When the user terminal 10 receives the abnormality occurrence notification, the user terminal 10 starts an engineering tool (Step S5), and displays the recovery process creation screen G based on the process database (Step S6). In Step S6, the user terminal 10 refers to the process database, identifies the process in which the process program is stored in the industrial machine 30, and displays on the recovery process creation screen G a list L showing the names of all the processes. It is assumed that when the subsequent processing is executed, the user terminal 10, the industrial machine 30A, and the industrial machine 30B are communicably connected to each other.

The user terminal 10 receives the specification of a process by the user (Step S7) based on the detection signal of the operation interface 14, and the industrial machine 30 executes the process (Step S8). In Step S7, the user specifies any process in the list L. In the case of specifying a plurality of processes, the user also specifies the execution order of those processes. It is assumed that the processes specified by the user are recorded in the user terminal 10 in chronological order. When the user specifies a process, the user terminal 10 changes the start variable of the process to a predetermined value. When the industrial machine 30 detects that the start variable has been changed to the predetermined value, in Step S8, the industrial machine 30 executes the process specified by the user.

The user terminal 10 determines, based on a detection signal of the operation interface 14, whether or not the "recovery completed" button B has been selected (Step S9). When it is not determined that the "recovery completed" button B has been selected (Step S9: N), the processing returns to Step S7. In this case, the specification of a process by the user is repeated until the abnormality that has occurred is recovered from.

Meanwhile, when it is determined that the "recovery completed" button B has been selected (Step S9: Y), the user terminal 10 transmits to the server 40 a request to record recovery process information (Step S10). The recording request is performed by transmitting data having a predetermined format. The recording request includes recovery process information. The user terminal 10 generates the recovery process information such that the process(es) specified by the user is (are) executed in the execution order specified by the user, and includes the generated recovery process information in the recording request to transmit the resultant recording request.

The server 40 receives the recording request, and stores the recovery process information included in the recording request in the recovery process database DB2 (Step S11). Referring next to FIG. 10, the user terminal 10 updates the system program Q such that the recovery process information is called by the process in which the abnormality has occurred (Step S12), and the controller 20 restarts the process (Step S13). In Step S12, the user terminal 10 updates the system program Q so as to request the recovery process information from the server 40 when an abnormality occurs. In Step S13, the user terminal 10 transmits a predetermined instruction to the controller 20, and the controller 20 returns the abort variable of the process in which the abnormality occurred to the initial value and restarts the process. The processing of returning the abort variable to the initial value may also be executed by the user terminal 10.

Meanwhile, when it is determined in Step S3 that the recovery process information has been registered (Step S3: Y), the controller 20 transmits to the server 40 a request to acquire the registered recovery process information (Step S14). The acquisition request is performed by transmitting data having a predetermined format. For example, the acquisition request includes the name of the recovery process information to be acquired. The name of the recovery process information to be acquired is described in the system program Q during the update performed in Step S12.

The server 40 receives the acquisition request, and transmits the recovery process information to the controller 20 based on the recovery process database DB2 (Step S15). The controller 20 receives the recovery process information, executes each process in the execution order indicated by the recovery process information to perform recovery from the abnormality that occurred (Step S16), and restarts the process (Step S17). In Step S16, the processing of Step S8 is executed in chronological order. The processing of Step S17 is the same as the processing of Step S13.

Meanwhile, when it is not determined in Step S2 that an abnormality has occurred in the industrial machine 30 (Step S2: N), the controller 20 determines whether or not the predetermined end condition is satisfied (Step S18). The end condition is a condition for ending the cycle, and any condition can be set, for example, the user performing a predetermined operation or the arrival of a predetermined date and time. When it is not determined that the end condition is satisfied (Step S18: N), the processing returns to Step S1, and the execution of each process is continued. Meanwhile, when it is determined that the end condition is satisfied (Step S18: Y), the processing ends.

According to the production system 1 of at least one embodiment, when an abnormality that has occurred in the industrial machine 30 is detected, based on process information, the specification of one or more processes to be executed in order to perform recovery is received and recorded as recovery process information. As a result, it is not required to create a recovery program by using a ladder chart, for example, and it is possible to reduce the time and effort involved in recovery from an abnormality that has occurred in the industrial machine 30. Execution of the process program P stored in the industrial machine 30 is controlled based on the value of a variable. Therefore, as long as the user specifies the process, recovery process information for changing the variable of the process can be generated, which eliminates the requirement to create a recovery program. For example, various abnormalities may occur in the industrial machine 30, and it takes a lot of time and effort to create a recovery program for each abnormality. However, by specifying the process to be executed in order to perform recovery from the abnormality and recording the execution result, such time and effort can be saved. For example, various abnormalities can be handled by combining processes in an appropriate order.

When the abnormality is again detected, it is possible to easily perform recovery from the abnormality that has occurred in the industrial machine 30 by acquiring one or more processes indicated by the recovery process information and executing the acquired one or more processes to perform recovery from the abnormality.

Further, when an abnormality is detected, the tasks to be performed during recovery can be performed more efficiently by displaying, based on the process information on each of the plurality of processes that can be executed by the industrial machine 30, the recovery process creation screen G which includes the name of each of the plurality of processes and on which the process(es) to be executed in order to perform recovery is (are) specifiable.

In addition, even when an abnormality can be recovered from only by sequentially executing processes, the reliability of a successful recovery can be increased by recording the recovery process information based on the execution order of the processes.

Moreover, the execution results of the recovery process can be managed in an integrated manner in the server by recording the execution results of the recovery process in the server in place of in the controller 20 controlling the industrial machine 30.

Even when it is required to execute the recovery process on another industrial machine 30 in charge of a process before the process in which the abnormality occurred in the industrial machine 30, the reliability of a successful recovery can be increased by enabling the process executed by the another industrial machine 30 to be recorded in the recovery process information.

5. Modification Examples

The present invention is not limited to at least one embodiment described above, and can be modified suitably without departing from the spirit of the present invention.

Figure 11:
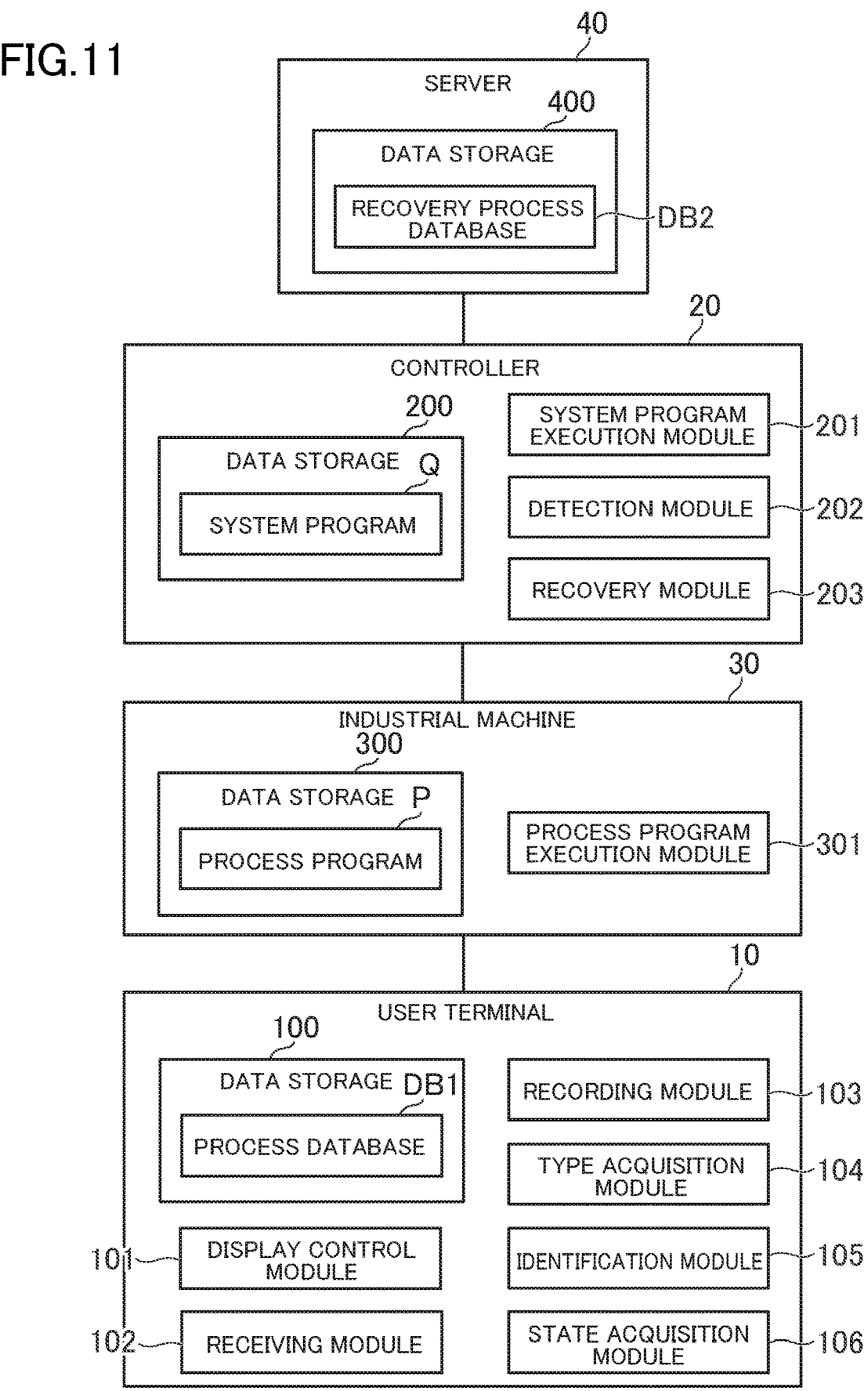
FIG. 11 is a functional block diagram in modification examples of the present invention.

FIG. 11 is a functional block diagram in modification examples of the present invention. As illustrated in FIG. 11, in the modification examples described below, in addition to the functions described in at least one embodiment, a type acquisition module 104, an identification module 105, and a state acquisition module 106 are implemented. For example, each of those functions is mainly implemented by the CPU 11.

(1) For example, even for the same process, the process required for recovery may differ depending on the type of abnormality that occurs. Therefore, the recovery process information may be recorded in the server 40 in association with the type of the abnormality that has occurred, and the recovery process information corresponding to the type of the abnormality that has occurred in the industrial machine 30 may be called.

In the user terminal 10 in Modification Example (1) of the present invention, the type acquisition module 104 is implemented. The type acquisition module 104 is configured to acquire the type of the abnormality detected by the detection module 202. The type of the abnormality is indicated by identification information, for example, an error code. In Modification Example (1), it is assumed that the type of the abnormality is identified based on a value of the abort variable. For example, the process program P changes the abort variable such that when an abnormality occurs, the value corresponds to the type of the abnormality. The type acquisition module 104 refers to the value of the abort variable of the process in which the abnormality has occurred, and acquires the type of the abnormality. The method of acquiring the type of the abnormality is not limited to the example described above, and any method can be used. For example, in a case where the industrial machine 30 in which the abnormality has occurred transmits an abnormality occurrence notification to the controller 20, the abnormality occurrence notification may include identification information on the type of the abnormality.

FIG. 12 is a table for showing a data storage example of the recovery process database DB2 in Modification Example (1). As shown in FIG. 12, the recording module 103 is configured to the recovery process information in association with the abnormality type acquired by the type acquisition module 104. A piece of recovery process information is stored in the recovery process database DB2 for each type of abnormality of each process. For example, the recording module 103 transmits identification information on the type of the abnormality and the recovery process information to the server 40. The server 40 receives the identification information and the recovery process information, and stores those pieces of information in the recovery process database DB2 in association with each other.

When the detection module 202 again detects the abnormality, the recovery module 203 acquires the one or more processes indicated by the recovery process information associated with the type of the abnormality, and executes the acquired one or more processes to perform recovery from the abnormality. The recovery module 203 acquires, of the recovery process information stored in the recovery process database DB2, the recovery process information associated with the type of the abnormality that has occurred. The recovery module 203 performs recovery from the abnormality based on the acquired recovery process information. The procedure itself for performing recovery from the abnormality based on the recovery process is as described in at least one embodiment.

According to Modification Example (1), when an abnormality is again detected, the reliability of a successful recovery can be increased by acquiring the one or more processes indicated by the recovery process information associated with the type of the abnormality, and executing the acquired one or more processes to perform recovery from the abnormality.

(2) Further, for example, the process required for recovery may differ depending on the process in which the abnormality has occurred. Therefore, the recovery process information may be recorded in the server 40 in association with the process in which the abnormality has occurred, and the recovery process information corresponding to the process in which the abnormality has occurred may be called.

In the user terminal 10 in Modification Example (2) of the present invention, the identification module 105 is implemented. The identification module 105 is configured to identify the process in which the abnormality detected by the detection module 202 has occurred. For example, the identification module 105 acquires the name of a process having an abort variable becoming a predetermined value as the name of the process in which the abnormality has occurred. The method of identifying the process in which the abnormality has occurred is not limited to the example described above, and any method can be used. For example, in a case where the industrial machine 30 in which the abnormality has occurred transmits an abnormality occurrence notification to the controller 20, the abnormality occurrence notification may include the name of the process in which the abnormality has occurred.

FIG. 13 is a table for showing a data storage example of the recovery process database DB2 in Modification Example (2). As shown in FIG. 13, the recording module 103 records the recovery process information in association with the process identified by the identification module 105. A piece of recovery process information is stored in the recovery process database DB2 for each process. For example, the recording module 103 transmits the name of the process in which the abnormality has occurred and the recovery process information to the server 40. The server 40 receives the name of the process in which the abnormality has occurred and the recovery process information, and stores those pieces of information in the recovery process database DB2 in association with each other.

When the detection module 202 again detects the abnormality, the recovery module 203 acquires the one or more processes indicated by the recovery process information associated with the process in which the abnormality has occurred, and executes the acquired one or more processes to perform recovery from the abnormality. The recovery module 203 acquires, of the recovery process information stored in the recovery process database DB2, the recovery process information associated with the process in which the abnormality has occurred. The recovery module 203 performs recovery from the abnormality based on the acquired recovery process information. The procedure itself for performing recovery from the abnormality based on the recovery process is as described in at least one embodiment.

According to Modification Example (2), when an abnormality occurs again, the reliability of a successful recovery can be increased by acquiring the one or more processes indicated by the recovery process information associated with the process in which the abnormality occurred, and executing the acquired one or more processes to perform recovery from the abnormality.

(3) Further, for example, the process required for recovery may differ depending on the state of the industrial machine 30 exhibited when the abnormality occurs. Therefore, the recovery process information may be recorded in the server 40 in association with the state of the industrial machine 30 exhibited when the abnormality occurs, and the recovery process information corresponding to the state exhibited when the abnormality occurs may be called.

In the user terminal 10 in Modification Example (3) of the present invention, the state acquisition module 106 is implemented. The user terminal 10 further includes the state acquisition module 106, which is configured to acquire the state of the industrial machine 30 exhibited when the detection module 202 detected an abnormality. The term "state" as used herein refers to an operating state of the industrial machine 30 exhibited when the abnormality occurs, and is, for example, a torque value, a motor rotation speed, a temperature, a workpiece state, a CPU usage rate, or a communication amount. The state of the industrial machine 30 may be detected by a sensor connected to the controller 20 or the industrial machine 30, or may be acquired based on a calculation result stored in the controller 20 or the industrial machine 30.

For example, in a case where an industrial machine 30 stores a variable indicating the state of the industrial machine 30, the state acquisition module 106 refers to the value of the variable, and acquires the state of the industrial machine 30. The method of acquiring the state of the industrial machine 30 is not limited to the example described above, and any method can be used. For example, in a case where the industrial machine 30 in which the abnormality has occurred transmits an abnormality occurrence notification to the controller 20, the abnormality occurrence notification may include information indicating the state of the industrial machine 30.

FIG. 14 is a table for showing a data storage example of the recovery process database DB2 in Modification Example (3). As shown in FIG. 14, the recording module 103 records the recovery process information in association with the state of the industrial machine 30 acquired by the state acquisition module 106. A piece of recovery process information is stored in the recovery process database DB2 for each state of the industrial machine 30. For example, the recording module 103 transmits the state of the industrial machine 30 and the recovery process information to the server 40. The server 40 receives the state of the industrial machine 30 and the recovery process information, and stores those pieces of information in the recovery process database DB2 in association with each other.

When the detection module 202 again detects the abnormality, the recovery module 203 acquires the one or more processes indicated by the recovery process information associated with the state of the industrial machine exhibited when the abnormality occurs, and performs recovery from the abnormality by executing the acquired one or more processes. The recovery module 203 acquires, of the recovery process information stored in the recovery process database DB2, the recovery process information associated with the state of the industrial machine 30. When there is not the exact same state in the recovery process database DB2, the recovery module 203 acquires recovery process information associated with a state similar to the state exhibited when the abnormality occurred. The term "similar" as used herein means that a difference between the values indicating the states is less than a threshold value. The recovery module 203 performs recovery from the abnormality based on the acquired recovery process information. The procedure itself for performing recovery from the abnormality based on the recovery process is as described in at least one embodiment.

According to Modification Example (3), when an abnormality is again detected, the reliability of a successful recovery can be increased by acquiring the one or more processes indicated by the recovery process information associated with the state of the industrial machine 30 exhibited when the abnormality occurred, and executing the acquired one or more processes to perform recovery from the abnormality.

(4) Further, for example, the receiving module 102 may receive a specification of a process to restart from after recovery from the abnormality detected by the detection module 202. The process to restart from may be any process among the processes included in the normal cycle, and is not limited to the process in which the abnormality occurred. For example, when processing is started over from the beginning, the process to be executed first may be specified as the restart process, or a process before the process in which the abnormality occurred may be specified as the restart process.

FIG. 15 is a table for showing a data storage example of the recovery process database DB2 in Modification Example (4) of the present invention. As shown in FIG. 15, the recording module 103 records, in association with the recovery process information, the process to restart from received by the receiving module 102. For example, the recording module 103 transmits the process to restart from specified by the user and the recovery process information to the server 40. The server 40 receives the process to restart from and the recovery process information, and stores those pieces of information in the recovery process database DB2 in association with each other. The recovery module 203 restarts from the process stored in the recovery process database DB2.

According to Modification Example (4), through recording the process to restart from after recovery from the abnormality in the recovery process information, restarting of the process can be performed quickly.

(5) Further, for example, the modification examples described above may be combined.

Further, for example, the user may specify a setting, for example, an execution condition, of the process (es) to be executed at the time of performing recovery from the abnormality. In this case, it is assumed that the setting specified by the user is stored in the recovery process information. Moreover, for example, the production system 1 may execute the processing until calling of the recovery process information, and cause the recovery to be executed by an external computer. In addition, for example, the specification of the process(es) may be received without displaying the recovery process creation screen G. For example, when the user remembers the name(s) of the process(es) or has written the process(es) in a list kept close at hand, input of the name(s) of the process(es) may be directly received without displaying the recovery process creation screen G.

Further, for example, there has been described a case in which the production system 1 includes the user terminal 10, the controller 20, the industrial machine 30, and the server 40, but the computers included in the production system 1 are not limited to the examples described in at least one embodiment. For example, the production system 1 is not required to include the controller 20 and the server 40. Moreover, for example, a system other than the industrial machine 30 may be called "recovery system." The recovery system can also be implemented by any computer. For example, the recovery system may include only the user terminal 10 and the server 40. In addition, for example, there has been described a case in which the main functions are implemented by the user terminal 10, but the functions described as being implemented by the user terminal 10 may be implemented by another computer, for example, the controller 20 or the server 40. Further, for example, the functions described as being implemented by the user terminal 10 may be distributed among a plurality of computers.

Further, for example, at least one embodiment described above is given as specific examples, and is not to limit the invention disclosed herein to the very configuration and data storage examples of the specific examples. A person skilled in the art may make various modifications to the disclosed at least one embodiment with regard to, for example, the shapes and numbers of physical components, data structures, and execution orders of processing. It should be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. A production system, comprising:
    an industrial machine configured to execute each of a plurality of recovery processes and each of a plurality of production processes; and
    circuitry;
    wherein the industrial machine is configured to:
        detect a change of a plurality of start variables that correspond to the plurality of recovery processes, and
        start each of the plurality of recovery process when the industrial machine detects the change in the corresponding start variable,
    wherein the circuitry is configured to:
        detect an abnormality that has occurred in the industrial machine when the industrial machine executes any one of the plurality of production processes;
        receive a specification from a controller of one or more recovery processes to be executed in order to perform recovery, based on a first recovery process information associating, for each of the plurality of recovery processes, at least a name of the each of the plurality of recovery processes with the start variable representing an operation of the industrial machine and indicating the change is to be performed by a recovery process program to be executed in the each of the plurality of recovery processes, when the abnormality is detected; and
        record a second recovery process information indicating one or more start variables of the received one or more recovery processes;
    wherein the controller is separated from the industrial machine and the controller is external of the industrial machine; and
    wherein the controller communicates with a plurality of industrial machines including the industrial machine via a network communication.

2. The production system according to claim 1, wherein the circuitry is configured to acquire, when the abnormality is again detected, the one or more recovery processes indicated by the recorded second recovery process information, and to execute the acquired one or more recovery processes to perform recovery from the abnormality.

3. The production system according to claim 2, wherein the circuitry is configured to:
    acquire a type of the detected abnormality;
    record the second recovery process information in association with the acquired type of the abnormality; and
    acquire, when the abnormality is again detected, the one or more recovery processes indicated by the second recovery process information associated with the type of the abnormality, and to execute the acquired one or more recovery processes to perform recovery from the abnormality.

4. The production system according to claim 2, wherein the circuitry is configured to:
   identify a production process in which the detected abnormality has occurred;
   record the second recovery process information in association with the identified production process; and
   acquire, when the abnormality is again detected, the one or more recovery processes indicated by the second recovery process information associated with the production process in which the abnormality occurred, and to execute the acquired one or more recovery processes to perform recovery from the abnormality.

5. The production system according to claim 2, wherein the circuitry is configured to:
   acquire a state of the industrial machine exhibited when the abnormality is detected;
   record the second recovery process information in association with the acquired state of the industrial machine; and
   acquire, when the abnormality is again detected, the one or more recovery processes indicated by the second recovery process information associated with the state of the industrial machine exhibited when the abnormality occurred, and to execute the acquired one or more recovery processes to perform recovery from the abnormality.

6. The production system according to claim 1, wherein the circuitry is configured to:
   display a recovery process creation screen which includes the name of each of the plurality of production processes and on which a recovery process to be executed in order to perform recovery is specifiable, when the abnormality is detected, based on the first recovery process information on each of the plurality of production processes; and
   receive a specification of the one or more recovery processes on the recovery process creation screen.

7. The production system according to claim 1, wherein the circuitry is configured to:
   receive a specification of the one or more recovery processes to be executed by the industrial machine in which the abnormality is detected and/or other industrial machine configured to execute one or more recovery processes before one or more production processes to be executed by the industrial machine, based on the first recovery process information of the industrial machine and the other industrial machine; and
   record the second recovery process information indicating the one or more recovery processes to be executed by the industrial machine and/or the other industrial machine.

8. The production system according to claim 1, wherein the circuitry is configured to:
   receive a specification of an execution order of the plurality of recovery processes; and
   record the second recovery process information based on the received execution order.

9. The production system according to claim 1, wherein the circuitry is configured to record the second recovery process information in another machine communicable to and from a control device configured to control the industrial machine.

10. The production system according to claim 1, wherein the circuitry is configured to:
    receive a specification of a production process to restart from after recovery from the detected abnormality; and
    record, in association with the second recovery process information, the received production process to restart from.

11. A recovery system, comprising a circuitry, the circuitry being configured to:
    detect a change of a plurality of start variables that correspond to the plurality of recovery processes,
    start each of a plurality of recovery process when the recovery system detects the change in the corresponding start variable;
    detect an abnormality that has occurred in an industrial machine configured to execute each of a plurality of processes when the industrial machine executes any one of the plurality of production processes;
    receive a specification from a controller of one or more recovery processes to be executed in order to perform recovery, based on a first recovery process information associating, for each of the plurality of recovery processes, at least a name of the each of the plurality of recovery processes with the start variable representing an operation of the industrial machine and indicating the change is to be performed by a recovery process program to be executed in the each of the plurality of recovery processes, when the abnormality is detected; and
  record a second recovery process information indicating one or more start variables of the received one or more recovery processes;
    wherein the controller is separated from the industrial machine and the controller is external of the industrial machine; and
    wherein the controller communicates with a plurality of industrial machines including the industrial machine via a network communication.

12. A production method to be performed by an industrial machine configured to execute each of a plurality of recovery processes and each of a plurality of production processes, the production method comprising:
    detecting a change of a plurality of start variables that correspond to the plurality of recovery processes, and
    starting each of the plurality of recovery process after detecting the change in the corresponding start variable,
    detecting an abnormality that has occurred in the industrial machine when the industrial machine executes any one of the plurality of production processes;
    receiving a specification of one or more processes from a controller to be executed in order to perform recovery, based on a first recovery process information associating, for each of the plurality of recovery processes, at least a name of the each of the plurality of recovery processes with the start variable representing an operation of the industrial machine and indicating the change is to be performed by a recovery process program to be executed in the each of the plurality of recovery processes, when the abnormality is detected; and
  recording a second recovery process information indicating one or more start variables of the one or more recovery processes;
    wherein the controller is separated from the industrial machine and the controller is external of the industrial machine; and
    wherein the controller communicates with a plurality of industrial machines including the industrial machine via a network communication.

13. A non-transitory information storage medium having stored thereon a program for causing a computer to:
- detect an abnormality that has occurred in an industrial machine configured to execute each of a plurality of recovery processes and each of a plurality of production processes;
- detect a change of a plurality of start variables that correspond to the plurality of recovery processes, and start each of the plurality of recovery process when the industrial machine detects the change in the corresponding start variable,
- receive a specification of one or more recovery processes from a controller to be executed in order to perform recovery, based on a first recovery process information associating, for each of the plurality of recovery processes, at least a name of the each of the plurality of recovery processes with the start variable representing an operation of the industrial machine and indicating the change is to be performed by a recovery process program to be executed in the each of the plurality of recovery processes, when the abnormality is detected; and record a second recovery process information indicating one or more start variables of the received one or more recovery processes;
- wherein the controller is separated from the industrial machine and the controller is external of the industrial machine; and
- wherein the controller communicates with a plurality of industrial machines including the industrial machine via a network communication.

14. The production system according to claim 3, wherein the circuitry is configured to:
- identify a production process in which the detected abnormality has occurred;
- record the second recovery process information in association with the identified production process; and
- acquire, when the abnormality is again detected, the one or more recovery processes indicated by the second recovery process information associated with the production process in which the abnormality occurred, and to execute the acquired one or more recovery processes to perform recovery from the abnormality.

15. The production system according to claim 3, wherein the circuitry is configured to:
- acquire a state of the industrial machine exhibited when the abnormality is detected;
- record the second recovery process information in association with the acquired state of the industrial machine; and
- acquire, when the abnormality is again detected, the one or more recovery processes indicated by the second recovery process information associated with the state of the industrial machine exhibited when the abnormality occurred, and to execute the acquired one or more recovery processes to perform recovery from the abnormality.

16. The production system according to claim 4, wherein the circuitry is configured to:
- acquire a state of the industrial machine exhibited when the abnormality is detected;
- record the second recovery process information in association with the acquired state of the industrial machine; and
- acquire, when the abnormality is again detected, the one or more recovery processes indicated by the second recovery process information associated with the state of the industrial machine exhibited when the abnormality occurred, and to execute the acquired one or more recovery processes to perform recovery from the abnormality.

17. The production system according to claim 2, wherein the circuitry is configured to:
- display, when the abnormality is detected, based on the second recovery process information on each of the plurality of recovery processes, a recovery process creation screen which includes the name of each of the plurality of recovery processes and on which a recovery process to be executed in order to perform recovery is specifiable; and
- receive a specification of the one or more recovery processes on the recovery process creation screen.

18. The production system according to claim 3, wherein the circuitry is configured to:
- display, when the abnormality is detected, based on the second recovery process information on each of the plurality of recovery processes, a recovery process creation screen which includes the name of each of the plurality of recovery processes and on which a recovery process to be executed in order to perform recovery is specifiable; and
- receive a specification of the one or more recovery processes on the recovery process creation screen.

19. The production system according to claim 4, wherein the circuitry is configured to:
- display, when the abnormality is detected, based on the second recovery process information on each of the plurality of recovery processes, a recovery process creation screen which includes the name of each of the plurality of recovery processes and on which a recovery process to be executed in order to perform recovery is specifiable; and
- receive a specification of the one or more recovery processes on the recovery process creation screen.

20. The production system according to claim 1, wherein the network communication is via a dedicated communication standard for industrial machines.

21. The production system according to claim 1, wherein the network communication is via ethernet.

* * * * *